US009015009B2

(12) United States Patent
Endert

(10) Patent No.: US 9,015,009 B2
(45) Date of Patent: Apr. 21, 2015

(54) VIRTUAL PRESS PLATE

(75) Inventor: Martin Endert, Spartanburg, SC (US)

(73) Assignee: Kings Mountain International, Inc., Kings Mountain, NC (US)

( * ) Notice: Subject to any disclaimer, the term of this patent is extended or adjusted under 35 U.S.C. 154(b) by 381 days.

(21) Appl. No.: 13/479,079

(22) Filed: May 23, 2012

(65) Prior Publication Data

US 2012/0303335 A1  Nov. 29, 2012

Related U.S. Application Data

(60) Provisional application No. 61/489,137, filed on May 23, 2011, provisional application No. 61/553,686, filed on Oct. 31, 2011.

(51) Int. Cl.
*G06F 17/50* (2006.01)

(52) U.S. Cl.
CPC ........ *G06F 17/5009* (2013.01); *G06F 2217/44* (2013.01); *Y02T 10/82* (2013.01)

(58) Field of Classification Search
CPC .............................. B41C 1/045; G06F 17/5009
USPC ............................................................ 703/1
See application file for complete search history.

(56) References Cited

U.S. PATENT DOCUMENTS 2,854,336 A *  9/1958  Gutknecht .................... 430/323
6,611,349 B1 *  8/2003  Vogt et al. .................... 358/1.15

OTHER PUBLICATIONS

Victor Ostromoukhov, "Digital Facial Engraving" Computer Graphics Proceedings, Annual Conference Series, 1999; pp. 1-8.*

* cited by examiner

*Primary Examiner* — Dwin M Craig
(74) *Attorney, Agent, or Firm* — Moore & Van Allen PLLC; W. Kevin Ransom

(57) ABSTRACT

Systems, methods and computer program products for a virtual press plate is disclosed. A method for creating a virtual press plate includes: (a) receiving a virtual decorative layer which is an electronic representation of a physical decorative layer; (b) receiving a first virtual engraving layer having one or more first markings that correspond to a first virtual depth level; (c) receiving a second virtual engraving layer having one or more second markings that correspond to a second virtual depth level; (d) creating a virtual press plate, which is an electronic representation of a physical press plate, based at least partially on the first and second virtual engraving layers; and (e) creating a virtual pressed decorative layer by virtually pressing the virtual press plate to the virtual decorative layer.

14 Claims, 18 Drawing Sheets

VIRTUAL PRESS PLATE

CROSS-REFERENCE TO RELATED APPLICATIONS

This application claims priority to U.S. Provisional Patent Application Ser. No. 61/489,137, filed May 23, 2011, entitled "Virtual Press Plate," and U.S. Provisional Patent Application Ser. No. 61/553,686, filed Oct. 31, 2011, entitled "Virtual Press Plate," the entirety of each of which is incorporated herein by reference.

FIELD

Embodiments of the present invention relate to the field of textured decorative laminates. In particular, some embodiments relate to methods and apparatuses for creating and/or using a virtual press plate, which is an electronic representation of a physical press plate used to manufacture textured decorative laminates.

BACKGROUND

Decorative laminates have been used as surfacing material for many years, in both commercial and residential applications. Decorative laminates can provide an aesthetically pleasing surface that is more economical and/or has improved physical characteristics compared to similar looking alternatives. For example, decorative laminates can be used to create flooring that has the appearance of real hardwood flooring but is less expensive and more durable than real hardwood flooring.

In addition to flooring, decorative laminates are often used in furniture, countertops, cabinets, wall paneling, partitions, fixtures, and the like. As described above, decorative laminates can be made to resemble real wood. Decorative laminates can also be made to resemble such other materials and surfaces as stone, ceramic, marble, concrete, leather, fabric, brick, tile, and the like. In other applications, instead of being made to resemble a particular traditional material or surface, a decorative laminate may be made to provide more fanciful surfaces.

More recently, decorative laminates have been improved to include a three-dimensional "textured" surface. In this way, decorative laminates can be made to not only look like some other material or surface, but can also be made to feel like the other material or surface. In fact, decorative laminates can be made to so closely resemble the look and feel of other materials that one cannot easily determine whether the surface includes the real materials or is a faux representation of the real materials. For example, a textured decorative laminate made to look like real wood paneling may include a plurality of depressions and/or protrusions on its surface to create a texture that simulates the grains and knots of real wood boards. In another example, the textured decorative laminate may be made to look like a plurality of ceramic tiles separated by grout lines. In such an embodiment, the surface of the laminate may be made so that the images of the grout lines are depressed relative to the images of the ceramic tiles. In still other applications, textured decorative laminates may be made with more fanciful virtual artwork and may have embossing and textures that work in conjunction with the virtual artwork to create a more interesting and aesthetically pleasing surface.

In general, decorative laminates are classified into two broad categories based on how the laminates are manufactured, namely "high" pressure decorative laminates (HPDLs) and "low" pressure decorative laminates (LPDLs). In general, the industry considers "high" pressure decorative laminates as those laminates that are manufactured or "laminated" under a pressure of generally more than 750 psig. "Low" pressure decorative laminates are typically manufactured at a pressure of about 300 to 600 psig.

HPDLs and LPDLs are often further distinguished by the fact that HPDLs are typically manufactured by first laminating a decorative paper layer with one or more other thin layers and a resin to create a relatively thin and flexible laminate. This thin and flexible laminate is then typically adhered to a thicker, self-supporting substrate layer during a later stage of manufacturing. In contrast, LPDLs are typically manufactured by laminating the decorative paper layer with the self-supporting substrate layer, such as particleboard or MDF, and a resin in a single laminating or "pressing" operation during its manufacture. Generally, the idea is that the higher pressures involved in manufacturing HPDLs may "crush" the substrate layer. For this reason, LPDLs are sometimes also referred to as "direct" pressure decorative laminates (DPDLs) since the decorative layer is laminated or "pressed" directly onto the core layer in a single step. However, it should be noted that, although manufacturing HPDLs typically involves the two steps described above while manufacturing LPDLs typically involves the one step described above, this is merely a generalization about the typical manufacturing processes used to make the two different types of laminates. In some procedures, an HPDL may be laminated with a self-supporting substrate layer in a single pressing step and a LPDL may be adhered to a substrate layer in more then one step.

FIG. 1 illustrates an exemplary physical LPDL 5 and press system 1, in accordance with an embodiment of the present invention. As illustrated in FIG. 1, the laminate 5 generally comprises a decorative layer 6 (sometimes referred to as a "décor") and a substrate layer 8. The decorative layer 6 is typically a physical sheet of paper or similar material having a decorative image or pattern printed thereon. The substrate layer 8 is used to provide structure to the laminate and may be, for example, particleboard, high-density fiberboard (HDF), medium-density fiberboard (MDF), or the like. The decorative layer 6 is soaked with resin, such as a melamine formaldehyde resin, and is bonded to the substrate layer 8. In some embodiments, one or more other layers are bonded with the decorative layer 6 and the substrate layer 8. For example, a substantially transparent wear resistant layer 12 may be bonded over top of the decorative layer 6 to protect the "top" surface of the final laminate. Likewise, a base layer 10 may be bonded to the lower surface of the substrate to protect the "bottom" surface of the final laminate.

As illustrated in FIG. 1, these layers are at least partially coated or saturated with resin and placed in a press 2 where they are bonded together under heat and pressure. For example, the layers are typically heated to approximately 160 to 220 degrees Celsius and pressed together at approximately 300 to 400 psi for approximately 15 to 20 seconds. The heat cures the thermosetting resin, thereby bonding the layers together. For textured decorative laminates, the upper portion of the press 2 typically has a press plate 4 attached thereto, where the press plate 4 has a plurality of depressions and/or protrusions arranged in a three-dimensional design. When the press plate 4 is physically pressed into the resin and against the upper surface of the laminate, the resin on the upper surface cures with an imprint of the three-dimensional surface of the press plate 4 therein. The press 2 may also include a lower press plate 3 attached thereto. The lower press plate 3 may have a flat, smooth surface or, in some embodiments, may have a plurality of depressions and/or protrusions arranged in a three-dimensional design so that the lower surface of the laminate is imprinted in addition to or as an alternative to the upper surface of the laminate.

A system for generating HPDLs may, in some cases, be similar to the LPDL system shown in FIG. 1. The pressures, and often temperatures, however, will generally be significantly higher in an HPDL system. Although the layering in an HPDL may be different, the manufacture of textured HPDLs still generally involves use of a press, a textured press plate, a decorative layer, and a thermosetting polymeric resin.

Typically, the party that manufactures the laminate has another party create the textured press plate(s) used in the manufacturing process. Since the press plates must be able to withstand significant and repetitive heat and pressure changes and since the press plates must typically have very detailed and precise texture patterns formed of many minuscule depressions and/or ridges in the press plate, the manufacturer of the press plate is typically a company that specializes in the manufacture of precision metal plates. Although the laminate manufacturer, and perhaps the end user of the laminate, generally decide on what will be a suitable texture for the resulting laminate, the press plate manufacturer is also usually involved in the design of the texture since the press plate company typically has significant knowledge of which textures are possible and at what cost different textures can be made. As such, the laminate manufacturer typically must work closely with the press plate manufacturer in order to obtain the desired look and feel of the finished laminate and to determine allowable tolerances in the registration of the press plate and the decorative layer.

Since the design process is traditionally an iterative one that involves physical press plates and physical decorative layers, there is a need for a faster and more economical way for the different parties involved in the design process to communicate ideas to one another about the press plates and the decorative layers. In addition, there is a need for methods and apparatuses that enable decision-makers to quickly determine how the finished, physical decorative laminate product will look and feel without having to make a physical press plate and decorative laminate each time a change is made or another idea is tried during the design process.

SUMMARY OF SELECTED EMBODIMENTS OF THE PRESENT INVENTION

In general terms, embodiments of the present invention relate to methods and apparatuses for creating and/or using virtual press plates and/or virtual decorative layers. As understood herein, a virtual decorative layer is an electronic representation (e.g., image file, object, plug-in, tool, etc.) of a physical decorative layer (sometimes referred to as a "décor") of a physical decorative laminate. Similarly, a virtual press plate is an electronic representation of a physical press plate. In accordance with embodiments of the present invention, the virtual press plate may be used to "virtually press" the virtual decorative layer in order to make that layer appear three-dimensional (i.e., make it appear virtually pressed). As such, the virtual press plate is a tool that can be used to simulate the "before" and "after" effects of pressing a physical decorative layer with a physical press plate. In turn, this enables press plate manufacturers and laminate manufacturers to view true representations of final decorative laminate products without having to actually undergo the costly and time-consuming process of manufacturing physical press plates and pressing physical decorative layers.

In addition, some embodiments of the present invention are embodied as an application (e.g., web-based application, mobile phone app, etc.) that enables its users (e.g., laminate manufacturers, press plate manufacturers) to virtually press one or more virtual decorative layers with one or more virtual press plates. The results of these virtual pressings, called virtual pressed decorative layers, may be saved, printed, used in presentations, and/or sent electronically, which enables laminate manufacturers and end users of decorative laminate products to view, consider, and order press plates more quickly, remotely, and at significantly lower costs than ever before.

In more general terms, some embodiments of the present invention provide a method that includes: (a) receiving a first virtual engraving layer having one or more first markings, where the one or more first markings correspond to a first virtual depth level; (b) receiving a second virtual engraving layer having one or more second markings, where the one or more second markings correspond to a second virtual depth level, and where the second virtual depth level is different than the first virtual depth level; and (c) creating, using a processor, a virtual press plate based at least partially on the first and second virtual engraving layers, where the virtual press plate is an electronic representation of a physical press plate that has the one or more first markings and the one or more second markings. In some of these embodiments, the method further includes: (a) receiving a virtual decorative layer, where the virtual decorative layer is an electronic representation of a physical decorative layer; and (b) creating a virtual pressed decorative layer by virtually pressing, using a processor, the virtual press plate to the virtual decorative layer, where the virtual pressed decorative layer is an electronic representation of the physical decorative layer after being pressed by the physical press plate.

Other embodiments of the present invention provide an apparatus having: (a) a datastore configured to store a first virtual engraving layer, a second virtual engraving layer, and a virtual decorative layer therein; and (b) a processor operatively connected to the datastore and configured to: (i) create a virtual press plate based at least partially on the first and second virtual engraving layers; and (ii) create a virtual pressed decorative layer by virtually pressing the virtual press plate to the virtual decorative layer.

Still other embodiments of the present invention provide a method that includes: (a) selecting a virtual decorative layer, where the virtual decorative layer is an electronic representation of a physical decorative layer; (b) selecting a virtual press plate, where the virtual press plate is an electronic representation of a physical press plate; and (c) virtually pressing, using a processor, the virtual press plate to the virtual decorative layer in order to create a virtual pressed decorative layer, where the virtual pressed decorative layer is an electronic representation of the physical decorative layer after being pressed by the physical press plate. In some of these embodiments, the selecting the virtual decorative layer, the selecting the virtual press plate, and the virtually pressing are performed using a website and/or using an application that executes on a mobile communications device (e.g., mobile phone, tablet computer, etc.).

BRIEF DESCRIPTION OF THE FIGURES

Figure 1:
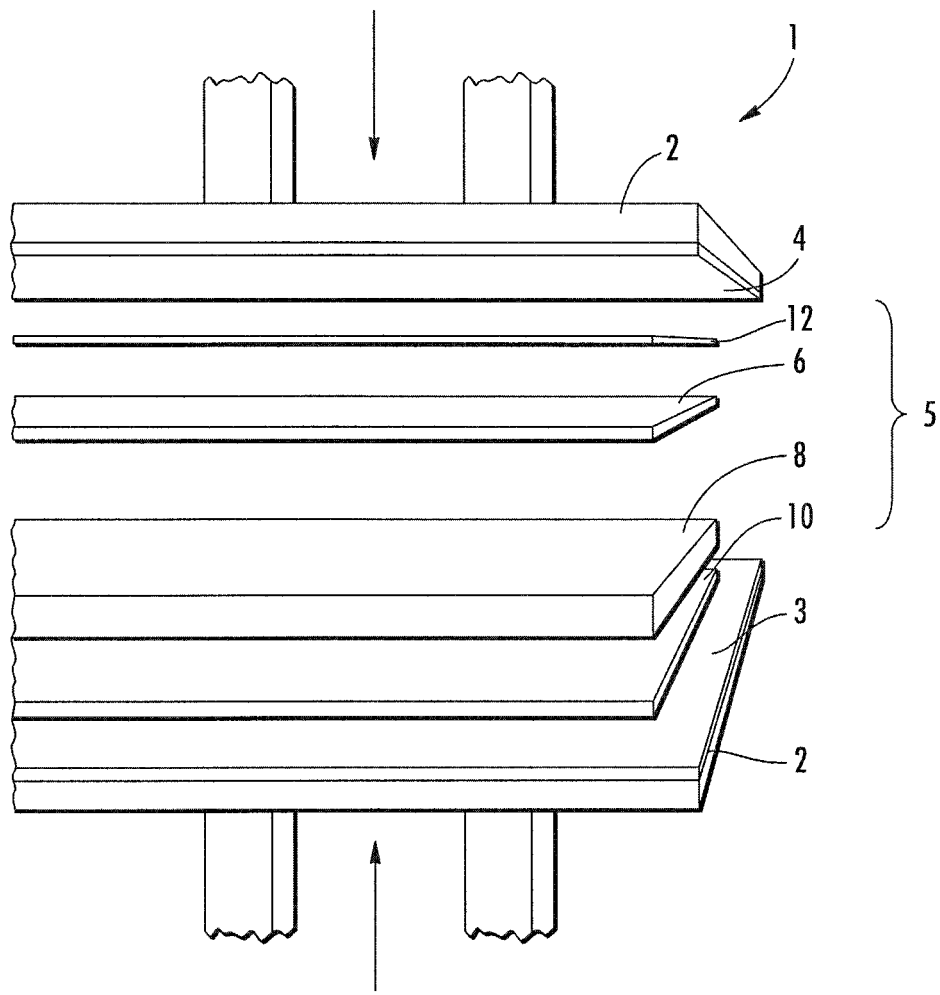
Figure 2:
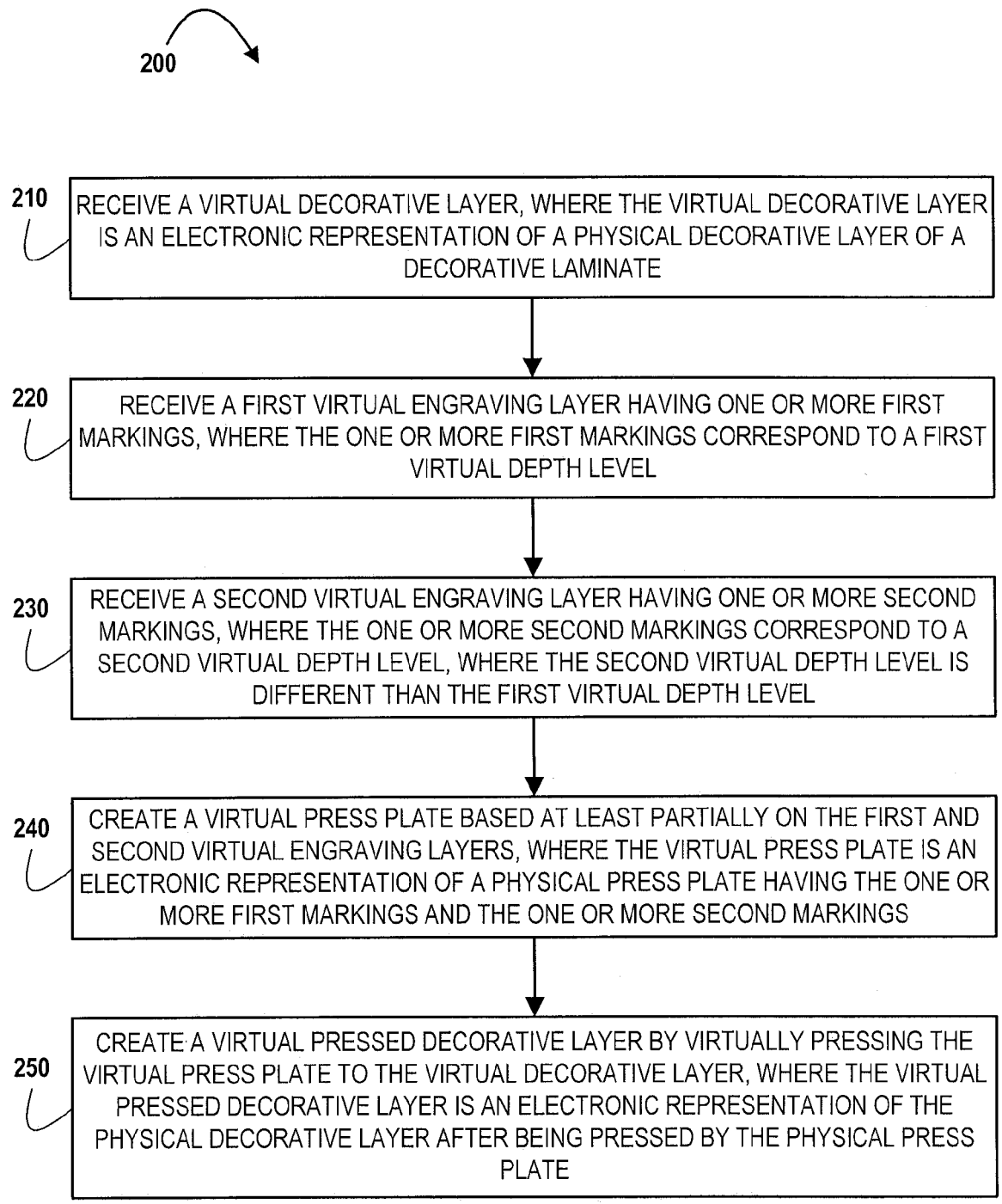
Figure 3:
Figure 4:
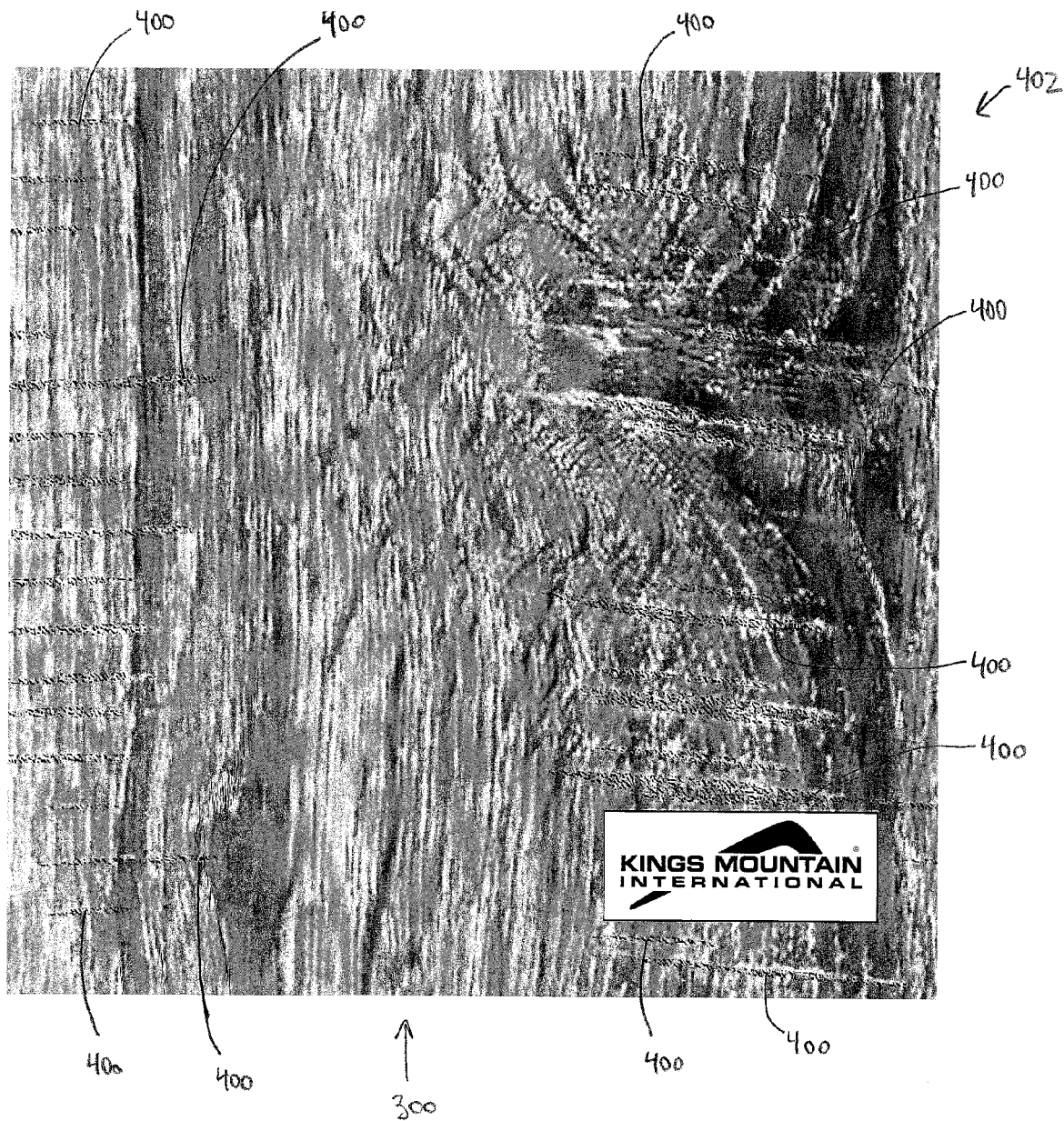
Figure 5:
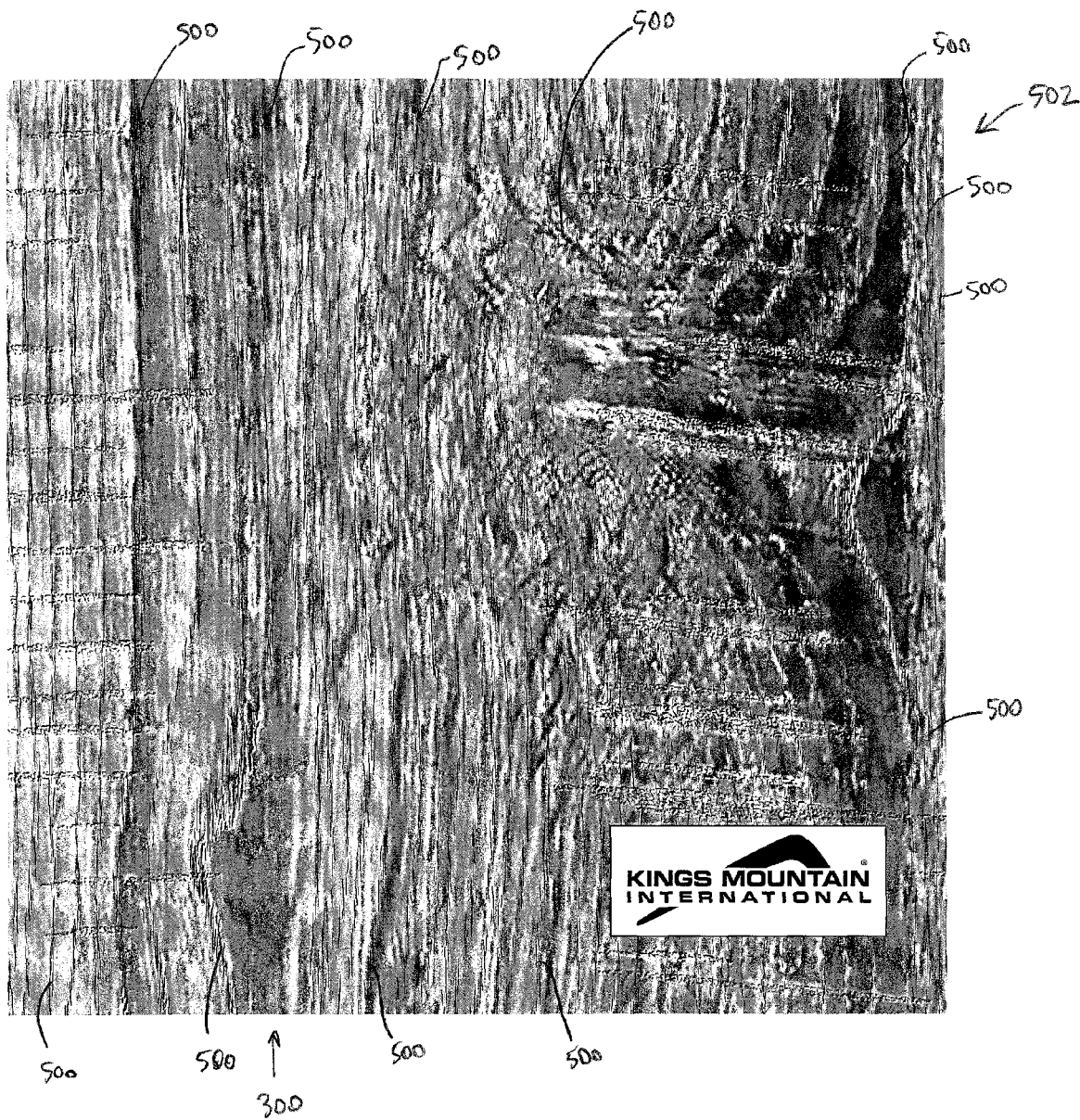
Figure 6:
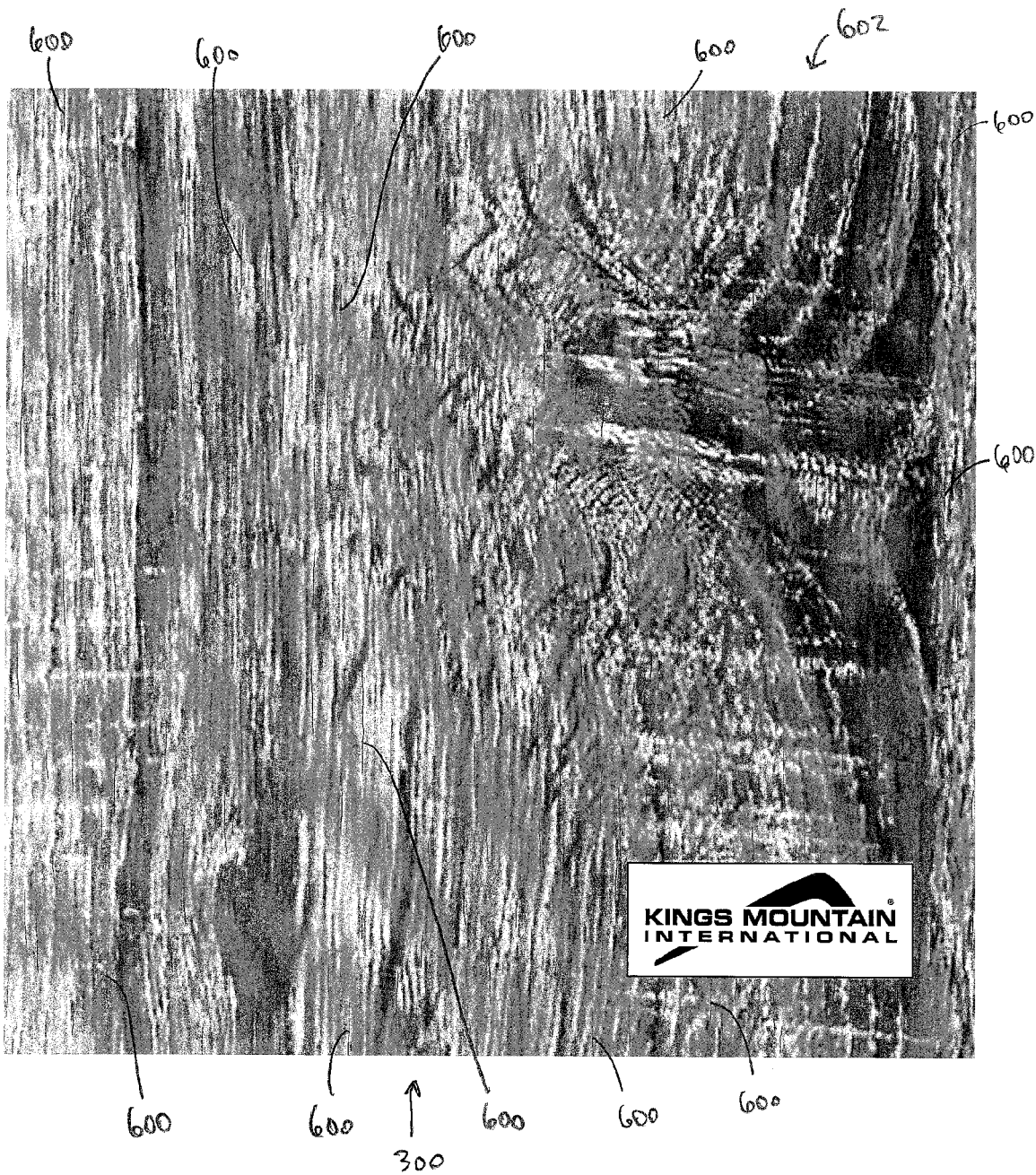
Figure 7:
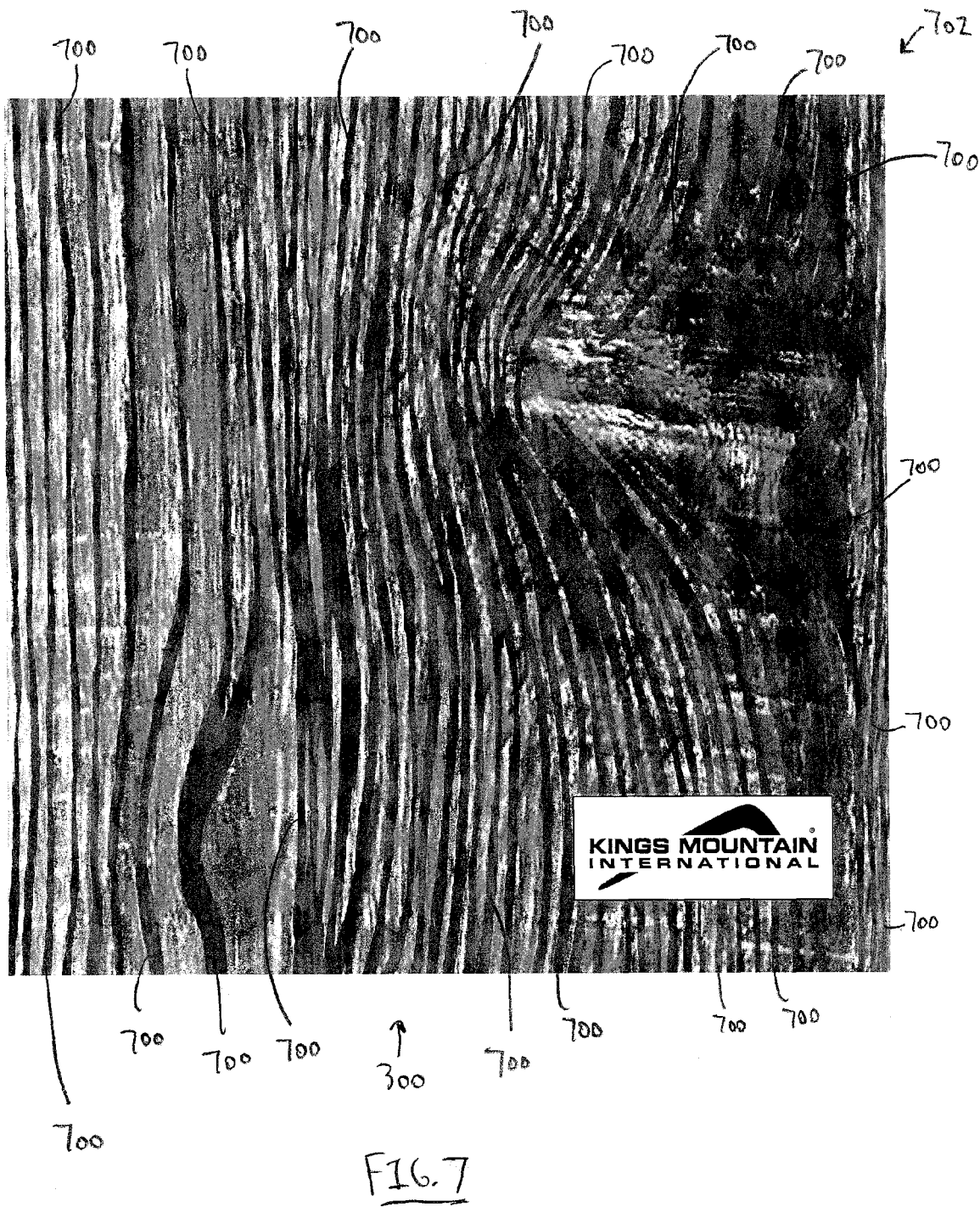
Figure 8:
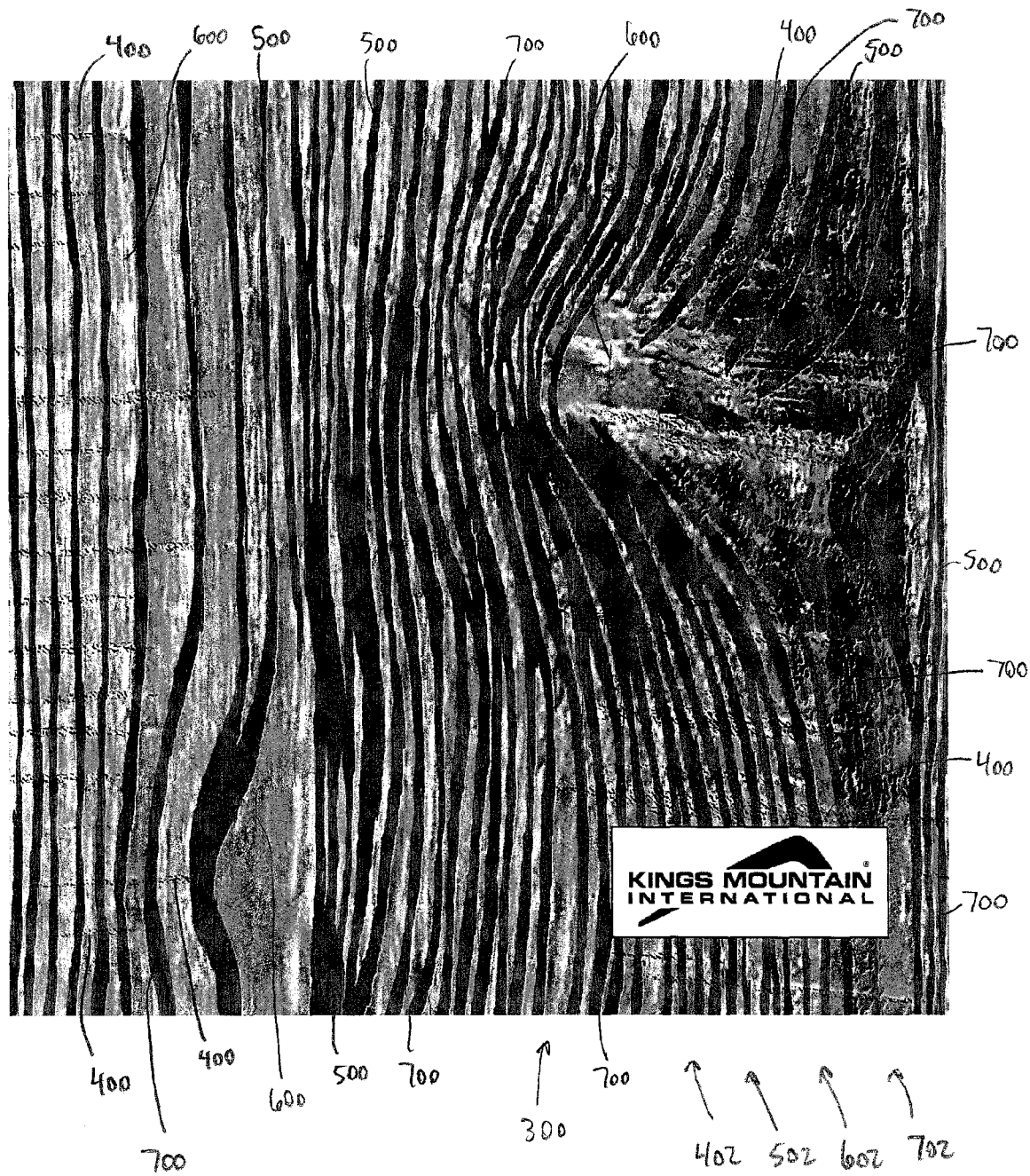
Figure 9:
Figure 10:
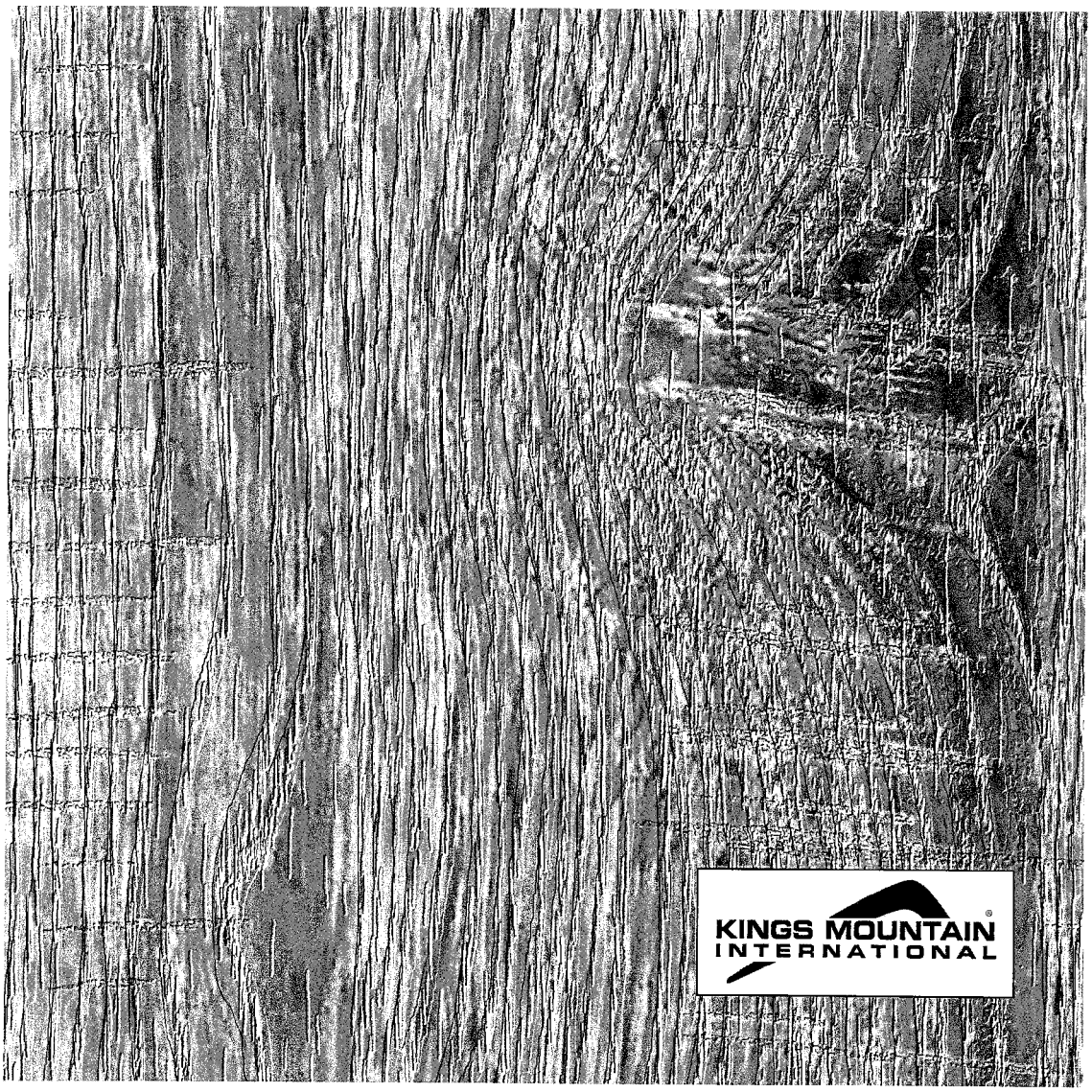
Figure 11:
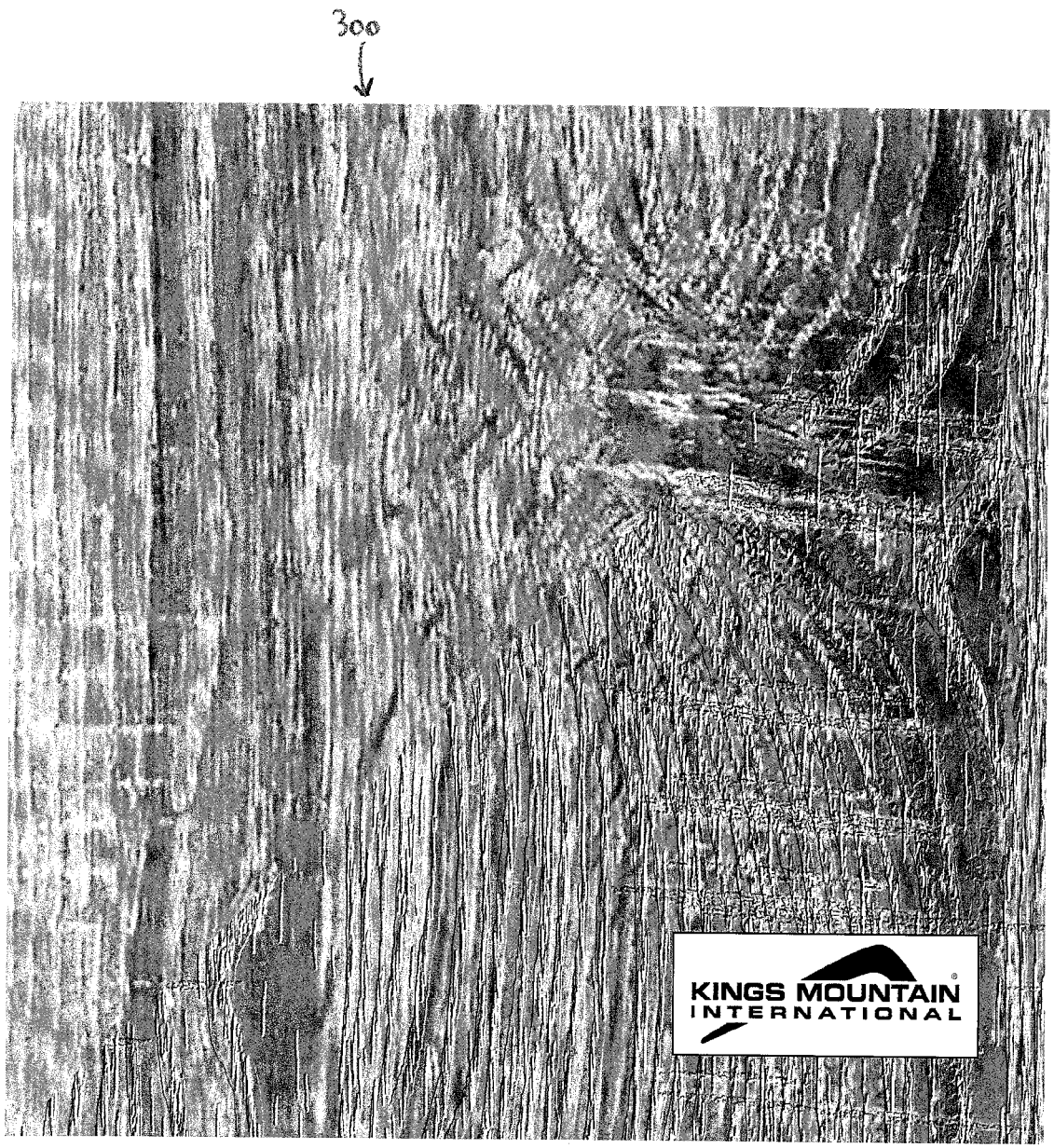
Figure 12:
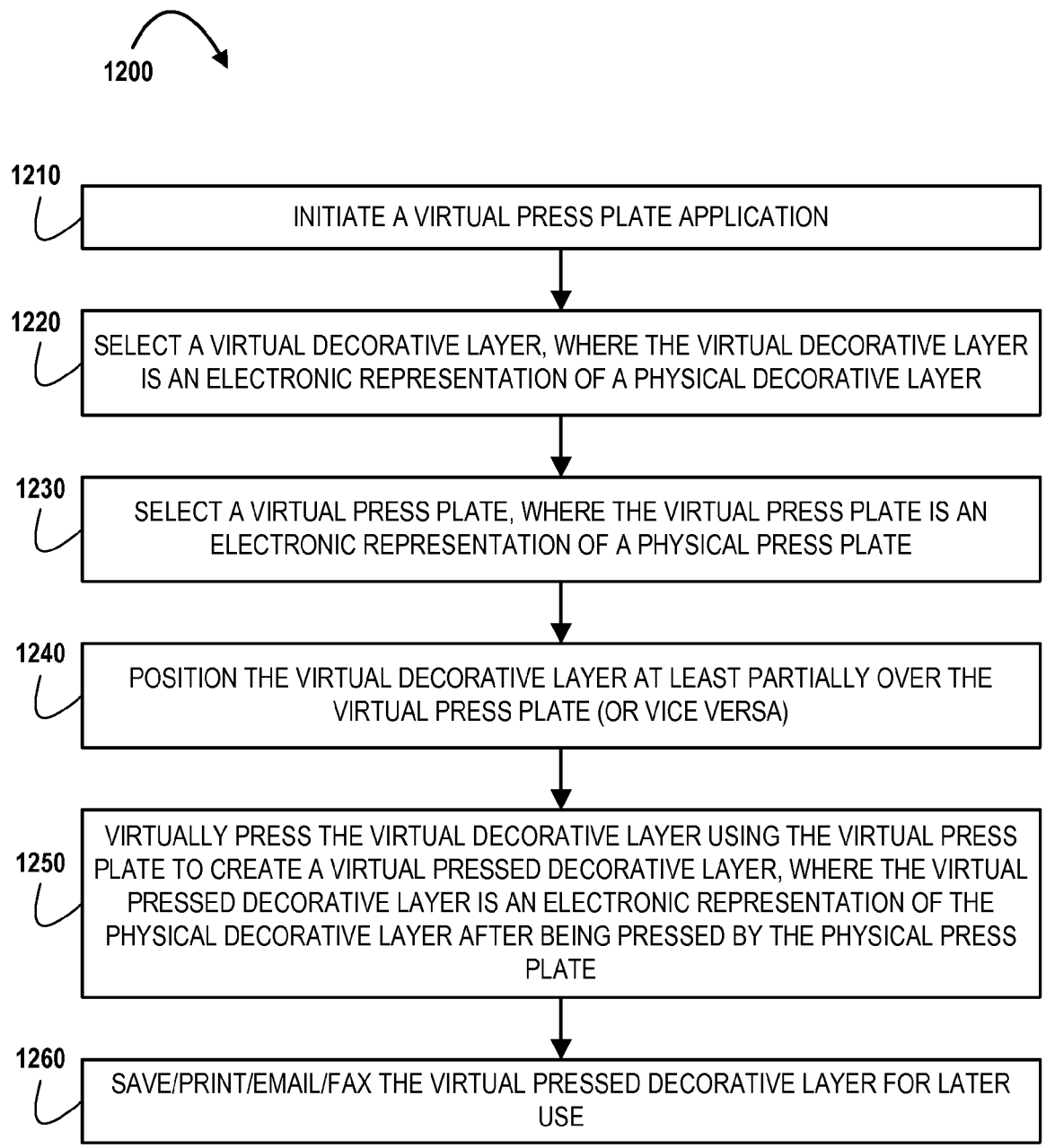
Figure 13:
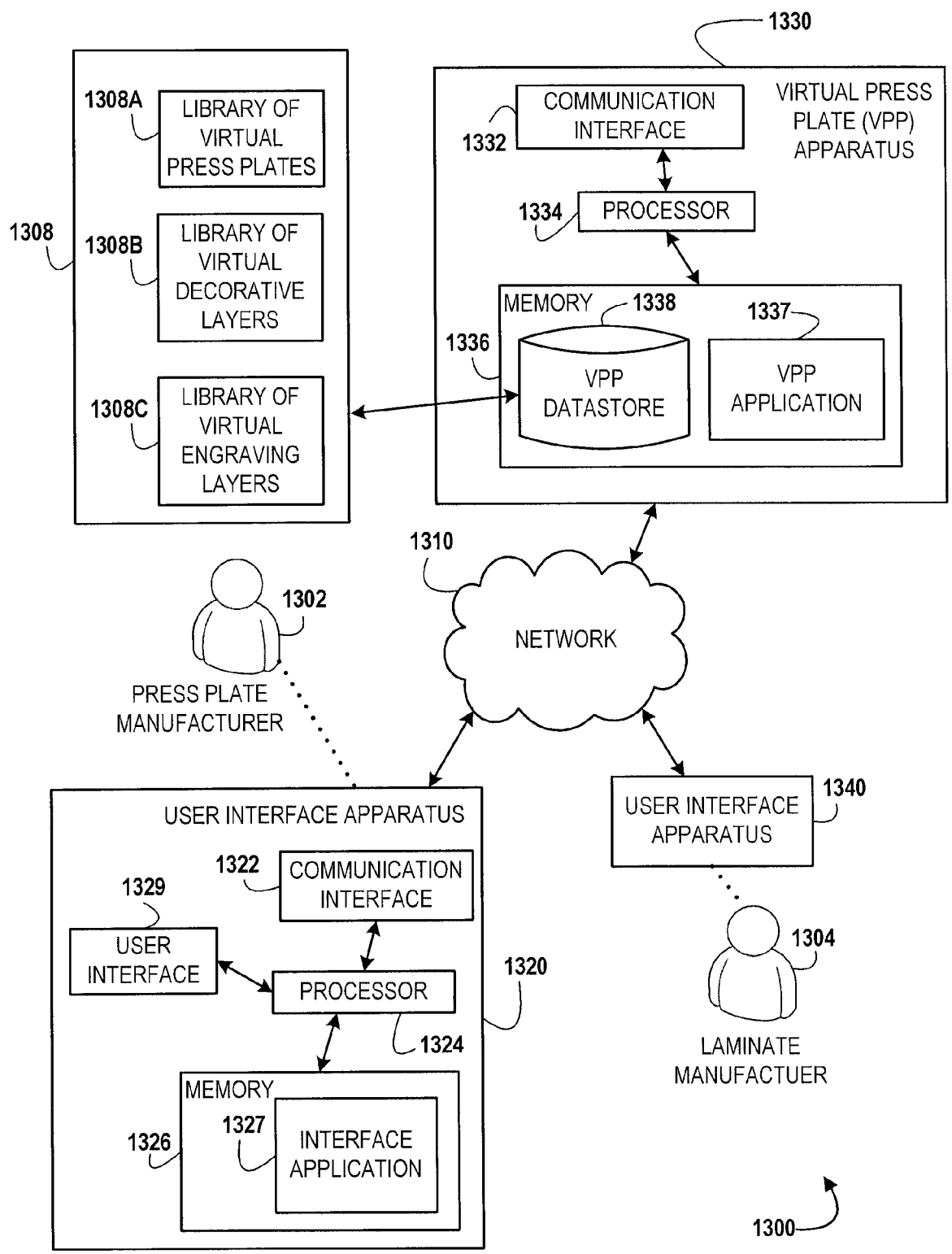
Figure 14A:
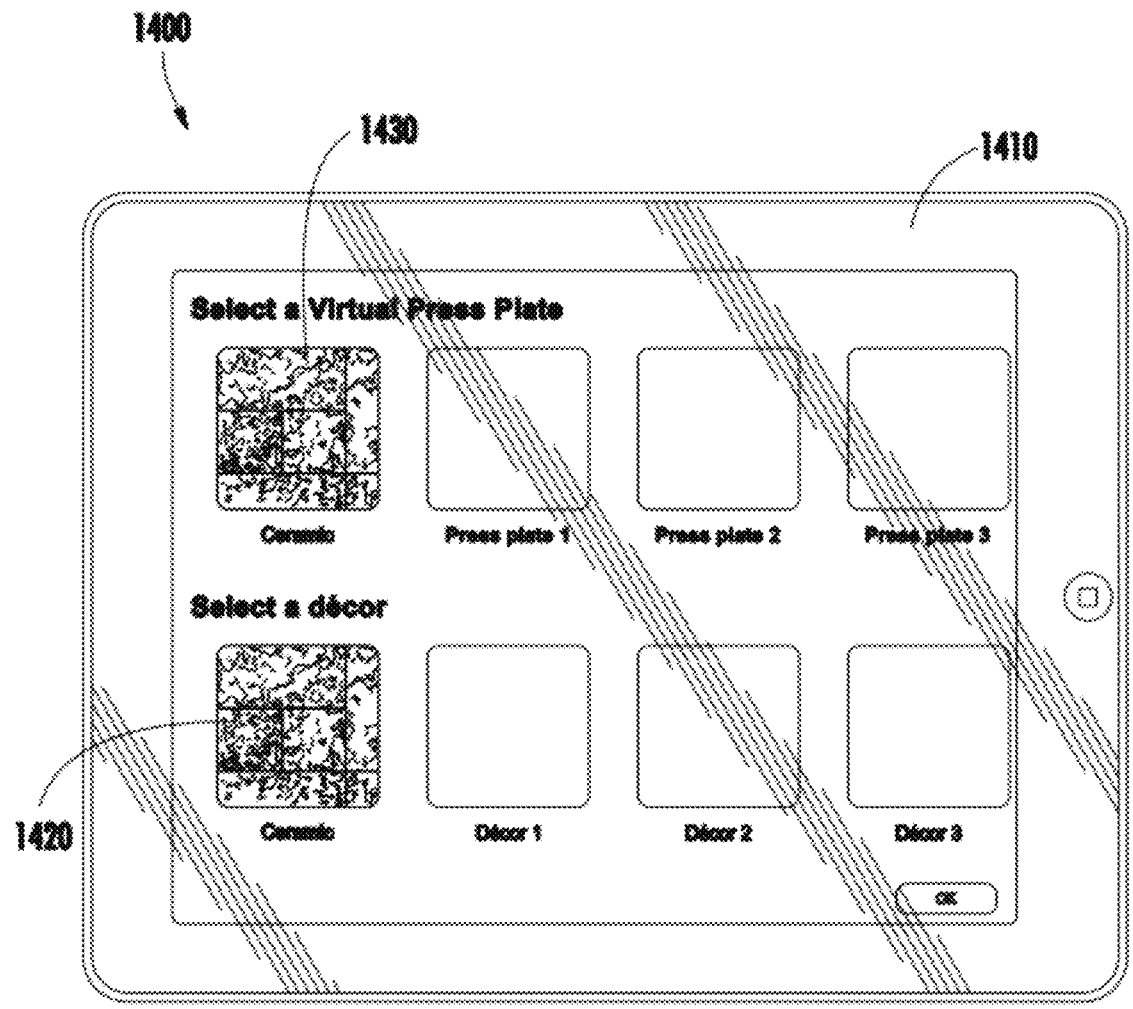
Figure 14B:
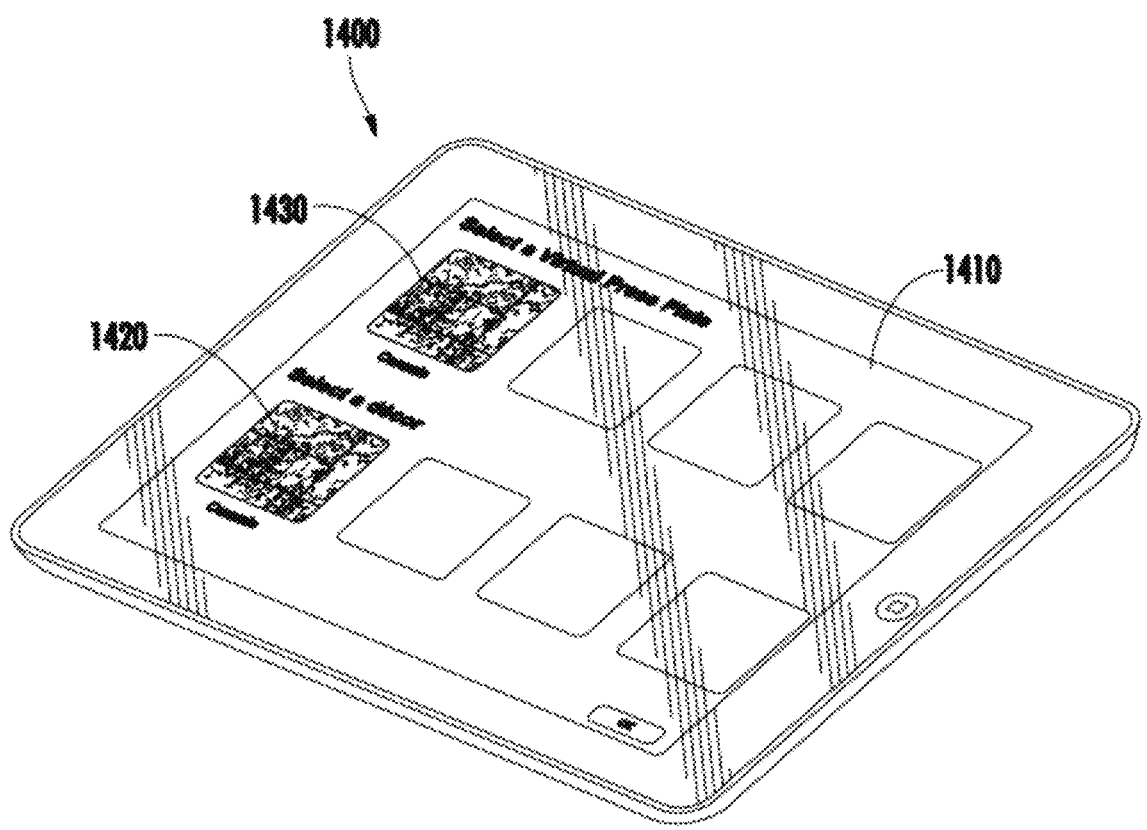
Figure 15:
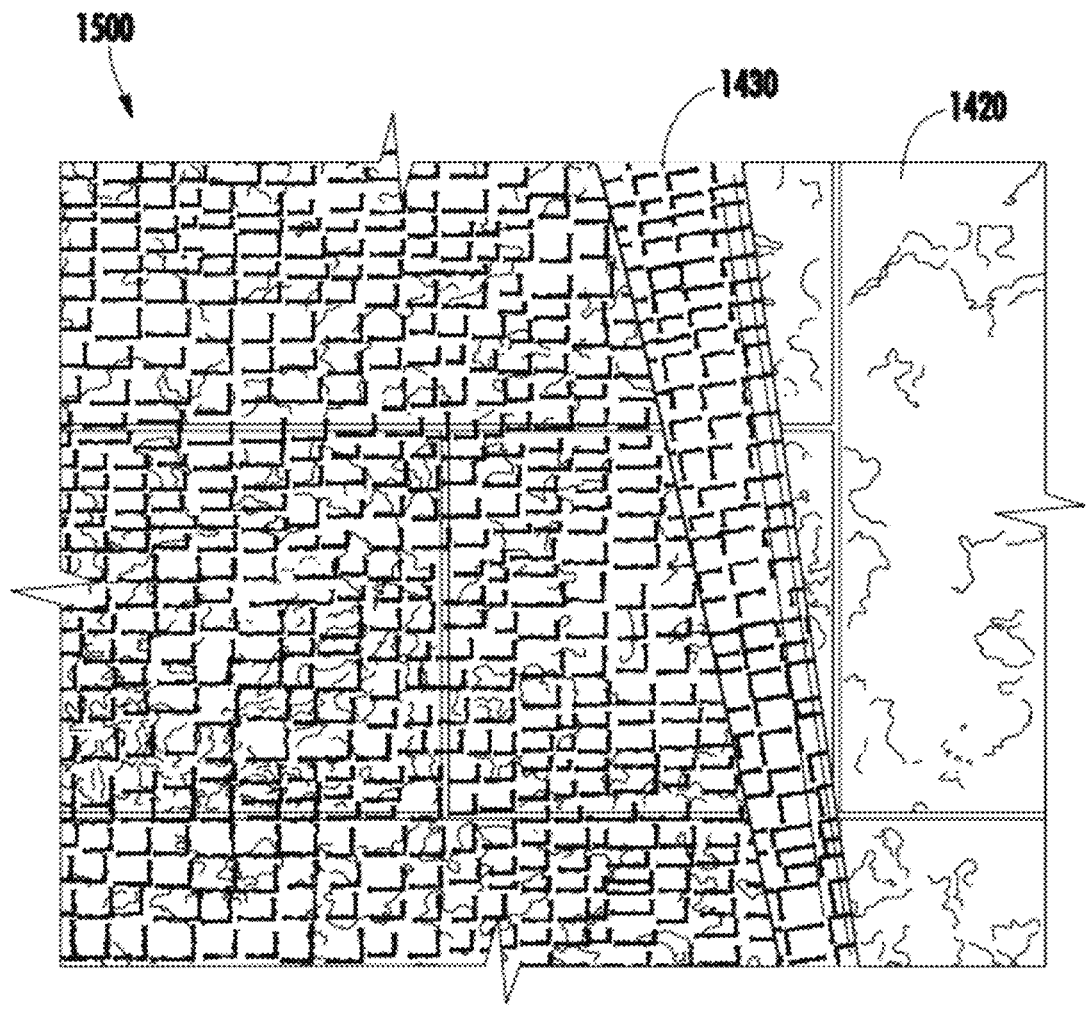
Figure 16:
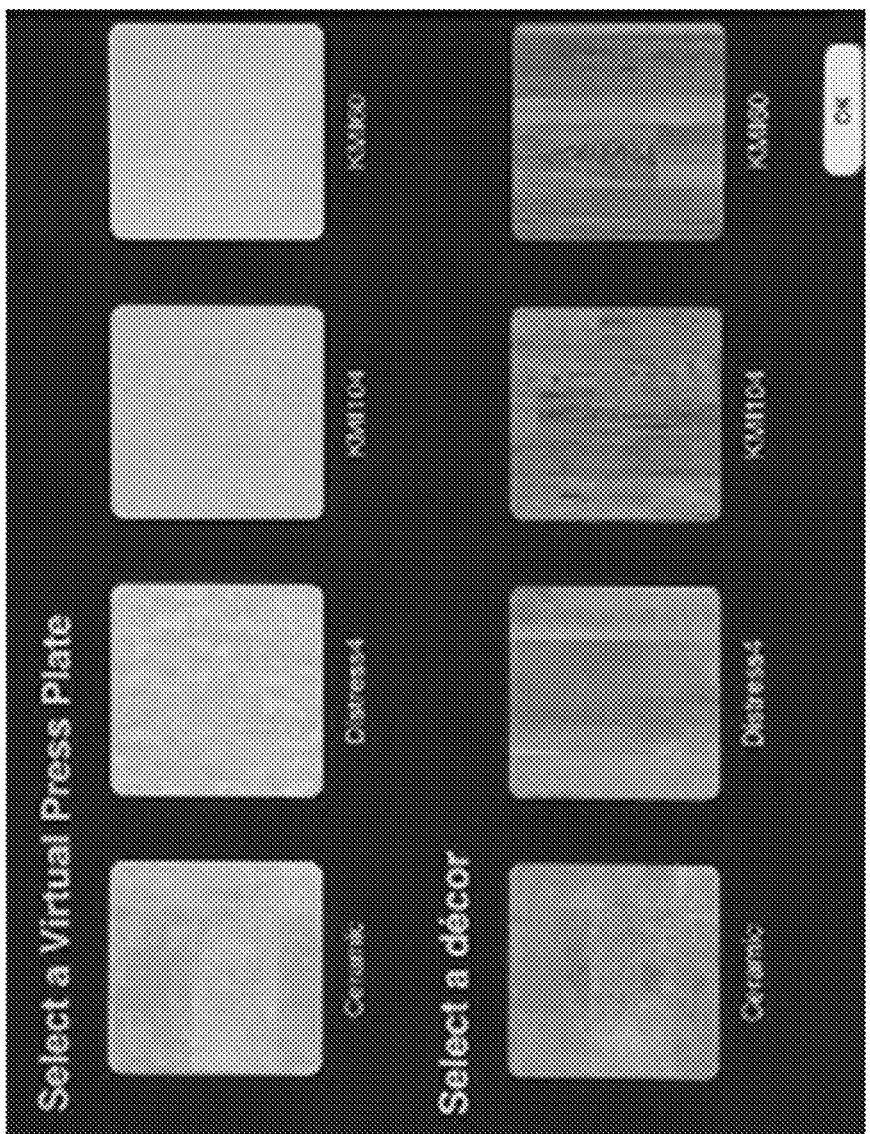
Figure 17:

Having thus described embodiments of the present invention in general terms, reference will now be made to the accompanying figures, which are not necessarily drawn to scale, and where:

FIG. 1 illustrates an exemplary physical low pressure decorative laminate and a physical low pressure press system, in accordance with an embodiment of the present invention;

FIG. 2 is a flow diagram illustrating a general process flow for creating and using a virtual press plate, in accordance with an embodiment of the present invention;

FIG. 3 illustrates an exemplary virtual decorative layer, in accordance with an embodiment of the present invention;

FIG. 4 illustrates the exemplary virtual decorative layer of FIG. 3 having a plurality of first markings drawn thereon, where the plurality of first markings form a first virtual engraving layer, in accordance with an embodiment of the present invention;

FIG. 5 illustrates the exemplary virtual decorative layer of FIG. 3 having a plurality of second markings drawn thereon, where the plurality of second markings form a second virtual engraving layer, in accordance with an embodiment of the present invention;

FIG. 6 illustrates the exemplary virtual decorative layer of FIG. 3 having a plurality of third markings drawn thereon, where the plurality of third markings form a third virtual engraving layer, in accordance with an embodiment of the present invention;

FIG. 7 illustrates the exemplary virtual decorative layer of FIG. 3 having a plurality of fourth markings drawn thereon, where the plurality of fourth marking form a fourth virtual engraving layer, in accordance with an embodiment of the present invention;

FIG. 8 illustrates the exemplary virtual decorative layer of FIG. 3 having the first, second, third, and fourth markings drawn thereon, in accordance with an embodiment of the present invention;

FIG. 9 illustrates an exemplary virtual press plate that was created based at least partially on the first, second, third, and fourth virtual engraving layers, in accordance with an embodiment of the present invention;

FIG. 10 illustrates an exemplary virtual pressed decorative layer that was created based at least partially on virtually pressing the virtual press plate to the virtual decorative layer, in accordance with an embodiment of the present invention;

FIG. 11 illustrates a side-by-side comparison of the virtual decorative layer of FIG. 3 and the virtual pressed decorative layer of FIG. 10, in accordance with an embodiment of the present invention;

FIG. 12 is a flow diagram illustrating a general process flow for selecting a virtual press plate and a virtual decorative layer, and for virtually pressing the virtual decorative layer using the virtual press plate to create a virtual pressed decorative layer, in accordance with an embodiment of the present invention;

FIG. 13 is a block diagram illustrating technical components of a system for creating and/or using a virtual press plate, in accordance with an embodiment of the present invention;

FIGS. 14A and 14B illustrate a mobile computing device executing an interface application, in accordance with an embodiment of the present invention;

FIG. 15 illustrates a mobile computing device executing an interface application, in accordance with an embodiment of the present invention;

FIG. 16 is a screenshot of a mobile computing device executing an interface application, in accordance with an embodiment of the present invention; and FIG. 17 is a screenshot of a mobile computing device executing an interface application, in accordance with an embodiment of the present invention.

DETAILED DESCRIPTION OF EMBODIMENTS OF THE PRESENT INVENTION

Referring now to FIG. 2, a general process flow 200 is provided for creating and using a virtual press plate, in accordance with an embodiment of the present invention. In some embodiments, the process flow 200 is performed by an apparatus (and/or a user of the apparatus) having hardware and/or software configured to perform one or more portions of the process flow 200. In such embodiments, as represented by block 210, the apparatus is configured to receive a virtual decorative layer, which is an electronic representation of a physical decorative layer of a decorative laminate. As represented by block 220, the apparatus is also configured to receive a first virtual engraving layer having one or more first markings, where the one or more first markings correspond to a first virtual depth level. As represented by block 230, the apparatus is further configured to receive a second virtual engraving layer having one or more second markings, where the one or more second markings correspond to a second virtual depth level, and where the second virtual depth level is different than the first virtual depth level. In addition, as represented by block 240, the apparatus is configured to create a virtual press plate based at least partially on the first and second virtual engraving layers. In some embodiments, the virtual press plate is an electronic representation of a physical press plate having the one or more first markings and the one or more second markings. Also, as represented by block 250, the apparatus is configured to create a virtual pressed decorative layer by virtually pressing the virtual press plate to the virtual decorative layer. In some embodiments, the virtual pressed decorative layer is an electronic representation of the physical decorative layer after being pressed by the physical press plate.

As used herein, the phrase "based at least partially on" is meant to have one or more of its ordinary meanings, but in other embodiments, that phrase is meant to have one or more ordinary meanings of one or more of the following terms and/or phrases: as a result of, because of, after, if, when, in response to, and/or the like. Still further, in some embodiments, the term "via" is meant to have its one or more ordinary meanings, but in other embodiments, that term is meant to have one or more ordinary meanings of one or more of the following terms and/or phrases: from, through, per, with the assistance of, by way of, and/or the like.

It will also be understood that the apparatus having the process flow 200 can include one or more separate and/or different apparatuses. For example, in some embodiments, one apparatus (e.g., the user interface apparatus 1320 described in connection with FIG. 13) is configured to perform the portions of the process flow 200 represented by blocks 210-230, and a second apparatus (e.g., the virtual press plate (VPP) apparatus 1330) is configured to perform the portions represented by blocks 240 and 250. As still another example, in some embodiments, a single apparatus (e.g., the VPP apparatus 1330) is configured to perform each and every portion of the process flow 200.

It will be understood that the virtual decorative layer, virtual press plate, and the virtual pressed decorative layer are embodied as electronic representations of a physical decorative layer, a physical press plate, and a physical pressed decorative layer, respectively. For example, in some embodiments, one or more of the virtual decorative layer, the first and/or second virtual engraving layers, the virtual press plate, and/or the virtual pressed decorative layer are embodied as one or more image files (e.g., .PSD files, .PSB files, .JPEG files, .GIF files, .TIFF files, .BMP files, digital image files, raster image files, vector image files, electronic image files, etc.). Specifically, in some embodiments, the virtual press plate is embodied as a .JPEG file, whereas in other embodiments, the first virtual engraving layer is embodied as a .PSD file. Additionally or alternatively, in some embodiments, one or more of these image files may be created, stored, and/or edited using a Photoshop® application or other graphics editing application.

Regarding block 210, in some embodiments, the virtual decorative layer may be received by a press plate manufacturer from a laminate manufacturer. In some cases, that virtual decorative layer may be the same image that the laminate manufacturer wishes to print on a physical decorative paper used to manufacture a physical decorative laminate. However, in other embodiments, the apparatus is configured to create (and/or the user of the apparatus may create) the virtual decorative layer and/or its decorative design. In still other embodiments, the virtual decorative layer is received from a library (e.g., datastore) of virtual decorative layers (e.g., library of virtual decorative layers 1308B). It will be understood that, in some embodiments, the virtual decorative layer may have a decorative design, where that design resembles wood, stone, ceramic, marble, concrete, leather, fabric, brick, tile, and/or the like. However, in other embodiments, the virtual decorative layer does not resemble any particular physical material; instead, in some embodiments, the virtual decorative layer is an image file having one or more colors (e.g., red, green, blue, etc.) and/or some type of pattern (e.g., stripes, stars, paisleys, argyle, etc.).

Regarding blocks 220 and 230, the apparatus may receive the first and/or second virtual engraving layers from one or more datastores (e.g., the library of virtual engraving layers 1308C). However, in other embodiments, the apparatus receives the first and/or second virtual engraving layers based at least partially on the apparatus and/or its user creating the first and/or second virtual engraving layers. For example, in some embodiments, the apparatus and/or its user may use software (e.g., Photoshop® application) and/or hardware (e.g., electronic stylus, pad, display) to draw the first and/or second markings (e.g., lines, areas, contours, etc.) that comprise those virtual engraving layers. In some embodiments, the markings are drawn based at least partially on the decorative design of the virtual decorative layer. For example, in some embodiments, the user of the apparatus electronically draws the markings with an electronic stylus and pad, such that the markings at least partially conform to and/or otherwise correspond to one or more portions of the decorative design. Specifically, the markings may be drawn to follow and/or conform to grout lines, wood grains and/or knots, tile imperfections, stripes, and/or other portions of a decorative design.

It will be understood that the creation of these virtual engraving layers typically requires significant human experience and knowledge of the surface and material that the virtual decorative layer will emulate. In addition, it also requires a deep understanding of how humans perceive images. For example, because each of the virtual engraving layers is inherently two-dimensional, the apparatus and/or its user must be able to create natural-looking engraving layers that appear to be three-dimensional in order to properly convey how a physical decorative layer will look when physically pressed. To do so, the user must understand how several different variables will interrelate, such as the apparent depth/height of embossed features, different surface textures, the gradualness and/or sharpness of transitions between features, the fineness and detail of the design, and the like. For example, in some embodiments, the user of the apparatus having the process flow 200 uses an electronic stylus and pad to draw the first markings as dark contours next to the light lines of the decorative design, and/or to draw the second markings as light contours next to the dark lines of the decorative design (or vice versa). In such embodiments, by emphasizing the transitions between the light and dark portions of the decorative design, the first and/or second markings may help create the illusion of depth, thereby making a two-dimensional image appear three-dimensional.

In addition to knowing where to draw the markings, the user of the apparatus must also know at which virtual depth level to make the markings so that the virtual press plate may appear as realistic as possible. However, unlike a real press plate, which has many actual depth levels, the virtual press plate has only a finite number of virtual depth levels. In some embodiments, the virtual press plate only has as many virtual depth levels as it has virtual engraving layers. To draw the virtual engraving layers, the user of the apparatus may draw the first markings in one color (e.g., blue) to indicate that those markings all have the same virtual depth level (i.e., the first virtual depth level). Similarly, the user may draw the second markings in a second color (e.g., red) to indicate that those markings all have the same virtual depth level (i.e., the second virtual depth level). As explained below, in addition to helping the user and/or apparatus distinguish which markings correspond to which virtual depth levels (and/or virtual engraving layers), the colors may also be used to create the virtual press plate.

Regarding block 240, in some embodiments, the first and second markings of the first and second virtual engraving layers are used to create the virtual press plate. For example, in some embodiments, the apparatus having the process flow 200 is configured to convert the first and second markings to different shades of gray, depending on the virtual depth level to which those markings correspond. For example, in some embodiments, the first markings have a deeper virtual depth level, whereas the second markings have a more shallow virtual depth level. In such embodiments, the apparatus may be configured to convert the first markings to a darker shade of gray than the second markings because a darker shade of gray creates the illusion of more depth. Additionally or alternatively, in some embodiments, the shades of gray are selected based on the colors of the markings, which themselves may correspond to different virtual depth levels. Of course, it will be understood that, instead of converting the first and second markings to shades of the gray, each of the first and/or second markings may be initially drawn in the appropriate shade of gray corresponding to its virtual depth level. Once the first and second markings are represented as appropriate shades of gray, the first virtual engraving layer is placed over the second virtual engraving layer, such that the first and second markings exist in the same image file. In some embodiments, this image file represents the virtual press plate. As such, in such embodiments, the virtual press plate is embodied as an image file (e.g., .JPEG image file) having grayscale lines and/or areas. In some cases, these lines and/or areas are referred to as vignette lines and/or areas.

Regarding block 250, the apparatus having the process flow 200 can be configured to virtually press the virtual decorative layer by combining the virtual press plate with the virtual decorative layer. In other words, in some embodiments, the apparatus can combine the image files corresponding to the virtual decorative layer and the virtual press plate to create a single combined image file. Once combined, the grayscale contours of the virtual press plate accentuate, highlight, emphasize, enhance, etc. the underlying decorative design of the virtual decorative layer, which results in the two-dimensional virtual decorative layer appearing three-dimensional and/or virtually pressed. This effect is shown most prominently in FIG. 11, which illustrates the virtual (unpressed) decorative layer 300 alongside the virtual pressed decorative layer 1000.

It will be understood that the apparatus configured to perform the process flow 200 can be configured to perform any of the portions of the process flow 200 represented by blocks 210-250 upon or after one or more triggering events (which, in some embodiments, is one or more of the other portions of the process flow 200). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the apparatus configured to perform the process flow 200 is configured such that the user of the apparatus drawing the first and second virtual engraving layers (the triggering event) automatically and immediately or nearly immediately (e.g., within 3-30 seconds, etc.) triggers the apparatus to create the virtual press plate (the triggered action). In some embodiments, the apparatus is additionally or alternatively configured to create the virtual pressed decorative layer (triggered action) automatically and immediately or nearly immediately after creating the virtual press plate (triggering event).

In accordance with some embodiments, the apparatus having the process flow 200 is configured to automatically perform one or more of the portions of the process flow 200 represented by blocks 210-250. However, as indicated above, in other embodiments, a user of the apparatus uses the apparatus to perform one or more of the portions of the process flow 200 represented by blocks 210-250. As such, in some embodiments, one or more portions of the process flow 200 require and/or involve human intervention. In addition, it will be understood that, in some embodiments, the apparatus configured to perform the process flow 200 (and/or a user thereof) is configured to perform one or more portions (or combinations of portions) of the process flow 200, from start to finish, within moments, seconds, and/or minutes (e.g., within approximately 1-5 minutes from start to finish, etc.). Of course, it will also be understood that the embodiment illustrated in FIG. 2 is merely exemplary and that other embodiments may vary without departing from the scope and spirit of the present invention.

Referring now to FIGS. 3-11, an exemplary virtual decorative layer 300, first virtual engraving layer 402, second virtual engraving layer 502, third virtual engraving layer 602, fourth virtual engraving layer 702, virtual press plate 900, and virtual pressed decorative layer 1000 are provided, in accordance with an embodiment of the present invention. In some embodiments, the virtual decorative layer 300 is the virtual decorative layer referred to in block 210 of the process flow 200, the virtual engraving layers 402 and 502 are the first and second virtual engraving layers referred to in blocks 220 and 230, the virtual press plate 900 is the virtual pressed plate referred to in block 240, and/or the virtual pressed decorative layer 1000 is the virtual pressed decorative layer referred to in block 250. It will be understood that, in some embodiments, the FIGS. 3-11 are in color, whereas in other embodiments, those Figures are in grayscale.

FIG. 3 illustrates the exemplary virtual decorative layer 300. It will be understood that the virtual decorative layer 300 is an electronic representation of a physical decorative layer of a sample decorative laminate. As shown, the virtual decorative layer 300 is embodied as an image file (e.g., .PSD file, .PSB file, .JPEG file, etc.) that can be overlaid and/or separated from other image files (e.g., the virtual engraving layers, etc.). Also as shown, the virtual decorative layer 300 has a decorative design that resembles real wood, which includes a plurality of wood grains and knots shown therein. However, it will be understood that the virtual decorative layer 300 looks like an image of wood and not like a real wood surface because the layer 300 does not project any depth or height. In other words, the virtual decorative layer 300 does not appear three-dimensional and is therefore not "virtually pressed." Instead, as shown in FIG. 3, the virtual decorative layer 300 appears as a flat image, devoid of any virtual embossings, virtual engravings, and/or other virtual textures.

FIG. 4 illustrates the exemplary first virtual engraving layer 402 placed over the virtual decorative layer 300 of FIG. 3. Like the virtual decorative layer 300, the first virtual engraving layer 402 is embodied as an image file (e.g., .PSD file, .PSB file, .JPEG file, etc.) that can be overlaid and/or separated from other image files, including the virtual decorative layer 300. As shown, the first virtual engraving layer 402 includes a plurality of first markings 400. (For simplicity, only a few of the first markings 400 are labeled in FIG. 4.) In some embodiments, each of the first markings 400 corresponds to a first virtual depth level (e.g., 0.5 cm) and/or includes engraving information indicating the same (e.g., the first markings 400 may be drawn in blue to indicate the first virtual depth level). Additionally, as shown in FIG. 4, the first markings 400 are drawn based at least partially on the decorative design of the virtual decorative layer 300. Specifically, the first markings 400 conform to one or more wood grains and/or knots shown in the decorative design of the virtual decorative layer 300.

FIG. 5 illustrates the exemplary second virtual engraving layer 502 placed over the virtual decorative layer 300. In some embodiments, the second virtual engraving layer 502 is embodied as an image file that can be overlaid and/or separated from other image files. As shown, the second virtual engraving layer 502 includes a plurality of second markings 500. (For simplicity, only a few of the second markings 500 are labeled in FIG. 5.) In some embodiments, each of the second markings 500 corresponds to a second virtual depth level (e.g., 0.8 cm) and/or includes engraving information indicating the same (e.g., the second markings 500 may be drawn in red to indicate the second virtual depth level). In some embodiments, the second virtual depth is different than the first virtual depth of the first markings 400. Also, as shown in FIG. 5, the second markings 500 are drawn based at least partially on the decorative design of the virtual decorative layer 300. Specifically, the second markings 500 conform to one or more wood grains and/or knots shown in the decorative design of the virtual decorative layer 300.

FIG. 6 illustrates the exemplary third virtual engraving layer 602 placed over the virtual decorative layer 300. In some embodiments, the third virtual engraving layer 602 is embodied as an image file that can be overlaid and/or separated from other image files. As shown, the third virtual engraving layer 602 includes a plurality of third markings 600. (For simplicity, only a few of the third markings 600 are labeled in FIG. 6.) In some embodiments, each of the third markings 600 corresponds to a third virtual depth level (e.g., 0.2 cm) and/or includes engraving information indicating the same (e.g., the third markings 600 may be drawn in green to indicate the third virtual depth level). In some embodiments, the third virtual depth level is different than the first and second virtual depth levels. Also, in this example embodiment, unlike the first markings 400 and second markings 500, the third markings 600 are not based on the decorative design of the virtual decorative layer 300. Instead, the third markings 600 are referred to as "all-over" markings because each of the markings looks the same and because the markings are the relatively uniformly distributed over the entire third virtual engraving layer 602. As such, the third markings 600 are not tied to a particular virtual decorative layer (e.g., the virtual decorative layer 300) and can be applied to many different virtual decorative layers.

FIG. 7 illustrates the exemplary fourth virtual engraving layer 702 placed over the virtual decorative layer 300. In some embodiments, the fourth virtual engraving layer 702 is embodied as an image file that can be overlaid and/or separated from other image files. As shown, the fourth virtual engraving layer 702 includes a plurality of fourth markings 700. (For simplicity, only a few of the fourth markings 700 are labeled in FIG. 7.) In some embodiments, each of the fourth markings 700 corresponds to a fourth virtual depth level (e.g., 1.2 cm) and/or includes engraving information indicating the same (e.g., the fourth markings 700 may be drawn in navy to indicate the fourth virtual depth level). In some embodiments, the fourth virtual depth level is different than the first, second, and third virtual depth levels. Also, in this example embodiment, the fourth markings 700 are drawn based at least partially on the decorative design of the virtual decorative layer 300. Specifically, as shown in FIG. 7, the fourth markings 700 conform to one or more wood grains and/or knots shown in the decorative design of the virtual decorative layer 300.

FIG. 8 illustrates the first, second, third, and fourth virtual engraving layers 402, 502, 602, and 702 placed over the virtual decorative layer 300. As shown, the virtual decorative layer 300 has the first, second, third, and fourth markings 400, 500, 600, and 700 drawn thereon. (For simplicity, only a few of the markings 400, 500, 600, and 700 are labeled in FIG. 8.)

FIG. 9 illustrates the exemplary virtual press plate 900. It will be understood that the virtual press plate 900 is an electronic representation of a physical press plate. It will also be understood that the virtual press plate 900 was created based at least partially on the first, second, third, and fourth virtual engraving layers 402, 502, 602, and 702 and/or the first, second, third, and fourth markings 400, 500, 600, and 700. Also, in some embodiments, the virtual press plate 900 is embodied as a grayscale image. For example, in some embodiments, after the image file shown in FIG. 8 is created, the markings 400, 500, 600, and 700 are converted into different shades of gray based at least partially on the virtual depth levels to which they correspond (e.g., the deeper levels are darker shades of gray, the more shallow levels are lighter shades of gray, etc.). Thereafter, the virtual decorative layer 300 is extracted from the image file shown in FIG. 8, such that the only remaining markings are the grayscale markings 400, 500, 600, and 700. Accordingly, in such embodiments, the virtual press plate 900 is embodied as an image file (e.g., .JPEG image file) having only grayscale lines and areas. Because grayscale is used, the virtual press plate 900 can be used to create the illusion of depth. More specifically, the virtual press plate 900 can be overlaid and/or otherwise combined with any colored (or grayscale) virtual decorative layer to make that two-dimensional virtual decorative layer appear three-dimensional (i.e., virtually pressed).

FIG. 10 illustrates the exemplary virtual pressed decorative layer 1000. It will be understood that the virtual pressed decorative layer 1000 shown in FIG. 10 is the result of virtually pressing the virtual press plate 900 to the virtual decorative layer 300. In some embodiments, this virtually pressing is performed using a processor and/or computer, and is based at least partially on the engraving information included in the first, second, third, and fourth markings 400, 500, 600, and 700. For example, in some embodiments, each of the markings is assigned a specific shade of gray that, when applied to the underlying virtual decorative layer 300, modifies the appearance of the decorative layer 300 so that certain portions of the decorative layer appear to have been engraved, embossed, and/or otherwise textured. In other words, by using grayscale markings, the virtual decorative layer 300 can be made to appear as though it were physically pressed.

FIG. 11 illustrates a side-by-side comparison of the virtual decorative layer 300 and the virtual pressed decorative layer 1000. More specifically, the bottom right-hand portion of FIG. 11 illustrates the virtual pressed decorative layer 1000, and the upper left-hand portion of FIG. 11 illustrates the virtual decorative layer 300 without any virtual pressing. Based on viewing FIG. 11, it is readily apparent that the virtual pressed decorative layer 1000 looks very different than the virtual decorative layer 300. Specifically, whereas the virtual decorative layer 300 appears two-dimensional, flat, and/or unpressed, the virtual pressed decorative layer 1000 appears three-dimensional (even though it is a two-dimensional electronic representation), textured, and/or pressed. As a result, the virtual pressed decorative layer 1000 enables a press plate manufacturer and laminate manufacturer to see how the corresponding physical pressed decorative layer would look if that layer were actually manufactured and pressed.

Referring now to FIG. 12, a general process flow 1200 is provided for selecting a virtual press plate and a virtual decorative layer, and for virtually pressing the virtual decorative layer with the virtual press plate to create a virtual pressed decorative layer, in accordance with an embodiment of the present invention. In some embodiments, the process flow 1200 is performed by an apparatus having hardware and/or software configured to perform one or more portions of the process flow 1200. In some of these embodiments, the apparatus is embodied as a personal computer, mobile phone, and/or tablet computer. Also, in some embodiments, the apparatus configured to perform the process flow 1200 is additionally or alternatively configured to perform the process flow 100.

In some embodiments, one or more portions of the process flow 1200 are performed at least partially by a human user of the apparatus having the process flow 1200. In such embodiments, as represented by block 1210, the user initiates a virtual press plate application (e.g., executing on the apparatus having the process flow 1200). As represented by block 1220, the user then selects a virtual decorative layer, where the virtual decorative layer is an electronic representation of a physical decorative layer. As represented by block 1230, the user also selects a virtual press plate, where the virtual press plate is an electronic representation of a physical press plate. In addition, as represented by block 1240, the user and/or the apparatus positions the virtual decorative layer at least partially over the virtual press plate (or vice versa). Thereafter, as represented by block 1250, the apparatus and/or the user virtually presses the virtual decorative layer using the virtual press plate to create a virtual pressed decorative layer, where the virtual pressed decorative layer is an electronic representation of the physical decorative layer after being pressed by the physical press plate. Thereafter, the user may save, print, email, and/or fax the virtual pressed decorative layer for later use, as represented by block 1260.

In some embodiments, one or more (or all) of the portions of the process flow 1200 are performed by using the application referred to in the block 1210. In some of these embodiments, the application executes on a user interface apparatus, such as, for example, a personal computer, mobile phone, and/or tablet computer. Specifically, in some embodiments, the application is embodied as a mobile phone app that can be downloaded onto a mobile phone (e.g., iPhone®, Droid®, etc.) and that executes on the mobile phone. As another example, in some embodiments, the application is embodied as a web-based application, program, and/or tool that is accessible to users via a website and/or network address. The application may also be downloaded and/or installed to execute on a PC or Mac personal computer.

In accordance with some embodiments, users of the application (e.g., laminate manufacturers) may upload and/or otherwise provide the virtual decorative layer referred to in block 1220, so that those users may view how their virtual decorative layer would appear if virtually pressed with the virtual press plate referred to in block 1230. In some of these embodiments, the virtual press plate and/or the application is provided by a press plate manufacturer for the benefit of its customers (e.g., laminate manufacturers, end users of decorative laminate products, etc.). Further, it will be understood that users of the application may receive (e.g., retrieve, collect, receive, etc.) the virtual decorative layer and the virtual press plate referred to in the process flow 1200 from one or more datastores (e.g., library of virtual decorative layers 1308A, library of virtual press plates 1308B, etc.), which may be provided by a press plate manufacturer.

Of course, it will also be understood that the embodiment illustrated in FIG. 12 is merely exemplary and that other embodiments may vary without departing from the scope and spirit of the present invention. For example, in some alternative embodiments, the apparatus having the process flow 1200 is configured to virtually unpress at least one portion of the virtual pressed decorative layer, such that the virtual pressed decorative layer has an unpressed portion and a pressed portion, and such that the unpressed portion may be viewed alongside the pressed portion (e.g., FIG. 11). In this way, users of the application can clearly view the way in which the virtual press plate affects the appearance of the virtual decorative layer. Also, in some alternative embodiments, the apparatus having the process flow 1200 is configured to virtually peel (and/or enables its users to virtually peel) at least one portion of the virtual decorative layer off and/or away from at least one portion of the virtual press plate. In some embodiments, this virtual peeling occurs after the virtual decorative layer has been at least partially placed over the virtual press plate and/or been at least partially pressed by the virtual press plate. For example, in some embodiments, a user may touch a touchscreen display of the apparatus with her finger in order to "grab" a corner of the virtual decorative layer (and/or virtual press plate) and then virtually peel, flip, and/or uncover that layer (and/or plate) from the underlying plate (and/or layer).

Referring now to FIG. 13, a system 1300 is provided for creating and/or using a virtual press plate, in accordance with an embodiment of the present invention. As illustrated, the system 1300 includes a network 1310, a user interface apparatus 1320, a virtual press plate apparatus 1330, and another user interface apparatus 1340. FIG. 13 also shows a press plate manufacturer 1302 (e.g., an employee of the press plate manufacturer) and a laminate manufacturer 1304 (e.g., an employee of the laminate manufacturer). In some embodiments, the laminate manufacturer 1304 is a customer of the press plate manufacturer 1302. As shown in FIG. 13, the press plate manufacturer 1302 has access to the user interface apparatus 1320, and the laminate manufacturer has access to the user interface apparatus 1340. In some embodiments, the press plate manufacturer maintains (e.g., owns, possesses, operates, controls, services, etc.) the user interface apparatus 1320, and/or the laminate manufacturer 1304 maintains the user interface apparatus 1340.

As shown in FIG. 13, the user interface apparatus 1320, the virtual press plate apparatus 1330, and the user interface apparatus 1340 are each operatively and selectively connected to the network 1310, which may include one or more separate networks. The network 1310 may include one or more telephone networks (e.g., cellular networks, CDMA networks, any wireline and/or wireless network over which communications to telephones and/or mobile phones are sent, etc.), local area networks (LANs), wide area networks (WANs), global area networks (GANs) (e.g., the Internet, etc.), and/or one or more other telecommunications networks. For example, in some embodiments, the network 1310 includes a telephone network to enable communications between the virtual press plate apparatus 1330 and the user interface apparatus 1340 (e.g., where the user interface apparatus 1340 is embodied as a mobile phone), and a global area network to enable communications between the authorization apparatus 1330 and the user interface apparatus 1320 (e.g., where the user interface apparatus 1320 is embodied as a personal computer). It will also be understood that the network 1310 may be secure and/or unsecure and may also include wireless and/or wireline technology.

The user interface apparatus 1320 may include any apparatus described and/or contemplated herein. In some embodiments, the user interface apparatus 1320 includes and/or is embodied as one or more personal computers, workstation computers, network devices, mobile communication devices (e.g., mobile phones, tablet computers, portable gaming devices), front end systems, back end systems, and/or the like. As illustrated in FIG. 13, in accordance with some embodiments of the present invention, the user interface apparatus 1320 includes a communication interface 1322, a processor 1324, a memory 1326 having a interface application 1327 stored therein, and a user interface 1329. In such embodiments, the processor 1324 is operatively and selectively connected to the communication interface 1322, the user interface 1329, and the memory 1326.

Each communication interface described herein, including the communication interface 1322, generally includes hardware, and, in some instances, software, that enables a portion of the system 1300, such as the user interface apparatus 1320, to send, receive, and/or otherwise communicate information to and/or from the communication interface of one or more other portions of the system 1300. For example, the communication interface 1322 of the user interface apparatus 1320 may include a modem, network interface controller (NIC), near field communication (NFC) interface, network adapter, network interface card, and/or some other electronic communication device that operatively connects the user interface apparatus 1320 to another portion of the system 1300, such as, for example, the authorization apparatus 1330.

Each processor described herein, including the processor 1324, generally includes circuitry for implementing the audio, virtual, and/or logic functions of that portion of the system 1300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 1327 of the memory 1326 of the user interface apparatus 1320.

Each memory device described herein, including the memory 1326 for storing the interface application 1327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 13, the memory 1326 includes the interface application 1327. The interface application 1327 can be executable, usable, and/or otherwise operable to (and/or enable the press plate manufacturer 1302 to) initiate, perform, complete, and/or facilitate one or more portions of any embodiment described and/or contemplated herein, such as, for example, one or more portions of the process flows 200 and/or 1200 described herein. For example, in some embodiments, the interface application 1327 is operable to receive and/or create one or more virtual decorative layers and/or one or more virtual engraving layers. As another example, in some embodiments, the interface application 1327 is operable to receive and/or create one or more virtual press plates based at least partially on one or more virtual engraving layers. In some embodiments, the interface application 1327 is configured to receive, create, and/or edit one or more virtual press plates, engraving layers, and/or decorative layers from the library of virtual press plates 1308A, the library of virtual decorative layers 1308B, and/or the library of virtual engraving layers 1308C, which are stored in the memory portion 1308 of the virtual press plate (VPP) datastore 1338. Additionally, in some embodiments, the interface application 1327 is operable to receive, create, and/or edit any of the virtual layers and/or press plates shown in FIGS. 3-11. As another example, in some embodiments, the interface application 1327 is operable to create a virtual pressed decorative layer by virtually pressing the virtual press plate to the virtual decorative layer. In some embodiments, the interface application 1327 is embodied as a downloadable app that can execute on the user interface apparatus 1320 (i.e., where the user interface apparatus 1320 is embodied as a mobile phone or tablet computer).

As yet another example, in some embodiments, the interface application 1327 is operable to initiate, access, and/or use the virtual press plate application 1337. As another example, in some embodiments, the interface application 1327 is operable to select (and/or enable the press plate manufacturer 1302 to select) one or more virtual decorative layers (e.g., from the library of virtual decorative layers 1308B) and/or one or more virtual press plates (e.g., from the library of virtual press plates 1308A). In some of these embodiments, the interface application is 1327 is further operable to position (and/or enable the press plate manufacturer 1302 to position) the one or more virtual decorative layers at least partially over one or more virtual press plates (and/or vice versa). Further, in some embodiments, the interface application is 1327 is operable to virtually press (and/or enable the press plate manufacturer 1302 to virtually press) the one or more virtual press plates to the one or more virtual decorative layers in order to create one or more virtual pressed decorative layers. As another example, in some embodiments, the interface application 1327 is operable to save, print, email, fax, and/or otherwise communicate and/or store the one or more virtual pressed decorative layers created.

In some embodiments, the interface application 1327 is operable to enable the press plate manufacturer 1302 and/or the user interface apparatus 1320 to communicate with one or more other portions of the system 1300, and/or vice versa. In some embodiments, the interface application 1327 includes one or more computer-executable program code portions for causing and/or instructing the processor 1324 to perform one or more of the functions of the interface application 1327 and/or user interface apparatus 1320 described and/or contemplated herein. In some embodiments, the interface application 1327 includes and/or uses one or more network and/or system communication protocols.

As shown in FIG. 13, the user interface apparatus 1320 also includes the user interface 1329. It will be understood that the user interface 1329 (and any other user interface described and/or contemplated herein) can include and/or be embodied as one or more user interfaces. It will also be understood that, in some embodiments, the user interface 1329 includes one or more user output devices for presenting information and/or one or more items to the user of the user interface apparatus (e.g., the press plate manufacturer 1302), such as, for example, one or more displays, speakers, printers, dispensers, and/or the like. In some embodiments, the user interface 1329 additionally or alternatively includes one or more user input devices, such as, for example, one or more buttons, keys, dials, levers, directional pads, joysticks, keyboards, keypads, mouses, accelerometers, controllers, microphones, touchpads, touchscreens, haptic interfaces, styluses, stylus pads, scanners, biometric readers, motion detectors, cameras, and/or the like for receiving information from the user of the user interface apparatus (e.g., the press plate manufacturer 1302).

FIG. 13 also illustrates a virtual press plate (VPP) apparatus 1330. The VPP apparatus 1330 may include any apparatus described and/or contemplated herein. In some embodiments, the VPP apparatus 1330 includes and/or is embodied as one or more servers, engines, mainframes, personal computers, workstation computers, network devices, front end systems, back end systems, and/or the like. In some embodiments, such as the one illustrated in FIG. 13, the VPP apparatus 1310 includes a communication interface 1332, a processor 1334, and a memory 1336, which includes a VPP application 1337 and an VPP datastore 1338 stored therein. As shown, the communication interface 1332 is operatively and selectively connected to the processor 1314, which is operatively and selectively connected to the memory 1336.

The VPP application 1337 can be executable, usable, and/or otherwise operable to initiate, perform, complete, and/or facilitate one or more portions of any embodiment described and/or contemplated herein, such as, for example, one or more portions of the process flows 200 and/or 1200 described herein. For example, in some embodiments, the VPP application 1337 is operable to receive and/or create a virtual decorative layer, a first virtual engraving layer, and a second virtual engraving layer. As another example, in some embodiments, the VPP application 1337 is operable to receive and/or create a virtual press plate based at least partially on one or more virtual engraving layers. In some embodiments, the VPP application 1337 is configured to receive, create, and/or edit one or more virtual press plates, engraving layers, and/or decorative layers from the library of virtual press plates 1308A, the library of virtual decorative layers 1308B, and/or the library of virtual engraving layers 1308C, which are stored in the portion 1308 of the virtual press plate datastore 1336. Additionally, in some embodiments, the VPP application 1337 is operable to receive, create, and/or edit any of the virtual layers and/or press plates shown in FIGS. 3-11. As another example, in some embodiments, the VPP application 1337 is operable to create a virtual pressed decorative layer by virtually pressing the virtual press plate to the virtual decorative layer.

As yet another example, in some embodiments, the VPP application 1337 is operable to initiate, access, and/or use the virtual press plate application 1337. As another example, in some embodiments, the VPP application 1337 is operable to select (and/or enable the press plate manufacturer 1302 to select) one or more virtual decorative layers (e.g., from the library of virtual decorative layers 1308B) and/or one or more virtual press plates (e.g., from the library of virtual press plates 1308A). In some of these embodiments, the VPP application is 1337 is further operable to position (and/or enable the press plate manufacturer 1302 to position) the one or more virtual decorative layers at least partially over one or more virtual press plates (and/or vice versa). Further, in some embodiments, the VPP application is 1337 is operable to virtually press (and/or enable the press plate manufacturer 1302 to virtually press) the one or more virtual press plates to the one or more virtual decorative layers in order to create one or more virtual pressed decorative layers. As another example, in some embodiments, the VPP application 1337 is operable to save, print, email, fax, and/or otherwise communicate and/or store the one or more virtual pressed decorative layers created.

In some embodiments, the VPP application 1337 is operable to enable the press plate manufacturer 1302 and/or the user interface apparatus 1320 to communicate with one or more other portions of the system 1300, and/or vice versa. In some embodiments, the VPP application 1337 includes one or more computer-executable program code portions for causing and/or instructing the processor 1324 to perform one or more of the functions of the VPP application 1337 and/or user interface apparatus 1320 described and/or contemplated herein. In some embodiments, the VPP application 1337 includes and/or uses one or more network and/or system communication protocols.

In addition to the VPP application 1337, the memory 1336 also includes the VPP datastore 1338. As shown, the VPP datastore 1338 stores the memory portion 1308, which includes the library of virtual press plates 1308A, the library of virtual decorative layers 1308B, and the library of virtual engraving layers 1308C. It will be understood that the VPP datastore 1338 can be configured to store any type and/or amount of information. In addition to the memory portion 1308, the VPP datastore 1338 may store any information related to creating and/or using a virtual press plate.

In accordance with some embodiments, the VPP datastore 1338 may include any one or more storage devices, including, but not limited to, datastores, databases, CDs, DVDs, thumb drives, and/or any other storage device typically associated with a computer system. It will also be understood that the VPP datastore 1338 may store information in any known way, such as, for example, by using one or more computer codes and/or languages, alphanumeric character strings, data sets, figures, tables, charts, links, documents, and/or the like. Further, in some embodiments, the VPP datastore 1338 includes information associated with one or more applications, such as, for example, the VPP application 1337 and/or the interface application 1327. In some embodiments, the VPP datastore 1338 provides a real-time or near real-time representation of the information stored therein, so that, for example, when the processor 1334 accesses the VPP datastore 1338, the information stored therein is current or nearly current. Although not shown, in some embodiments, the user interface apparatus 1320 includes a transaction datastore that is configured to store any information associated with the user interface apparatus 1320, the interface application 1327, and/or the like. It will be understood that the transaction datastore can store information in any known way, can include information associated with anything shown in FIG. 13, and/or can be configured similar to the VPP datastore 1338.

Also shown in FIG. 13 is the user interface apparatus 1340. In accordance with some embodiments, the user interface apparatus 1340 can be similarly and/or identically embodied and/or configured as the user interface apparatus 1320. In addition, the user interface apparatus 1340 can be configured to perform any embodiment described and/or contemplated herein. As shown, the user interface apparatus 1340 is accessible to the laminate manufacturer 1304, and in some embodiments, can be used by the laminate manufacturer 1304 to virtually press one or more virtual press plates (e.g., from the library of virtual press plates 1308A) to one or more virtual decorative layers (e.g., from the library of virtual decorative layers 1308B). In other embodiments, the laminate manufacturer 1304 provides, sends, uploads, and/or otherwise communicates the one or more virtual decorative layers to be virtually pressed. For example, in some embodiments, the laminate manufacturer 1304 may prefer to see how a particular virtual decorative layer provided by the laminate manufacturer 1304 would look after being virtually pressed by a virtual press plate provided by the press plate manufacturer 1302. In some of these embodiments, the laminate manufacturer 1304 is interested in virtually pressing his virtual decorative layer because the resulting virtual pressed decorative layer substantially and/or identically corresponds to what a physical pressed decorative layer (and therefore the physical decorative laminate) would look like.

It will be understood that the embodiments illustrated in FIG. 13 is exemplary and other embodiments may vary. For example, in some embodiments, some or all of the portions of the system 1300 are combined into a single portion. Specifically, in some embodiments, the user interface apparatus 1320 and the VPP apparatus 1330 are combined into a single user interface and VPP apparatus that is configured to perform all of the same functions of those separate portions as described and/or contemplated herein. Likewise, in some embodiments, some or all of the portions of the system 1300 are separated into two or more distinct portions. In addition, the various portions of the system 1300 may be maintained by the same or separate parties.

The system 1300 and/or one or more portions of the system 1300 may include and/or implement any embodiment of the present invention described and/or contemplated herein. For example, in some embodiments, the system 1300 (and/or one or more portions of the system 1300) is configured to implement any one or more embodiments of the process flow 200 described and/or contemplated herein in connection with FIG. 2, any one or more embodiments described and/or contemplated herein in connection with FIGS. 3-11, and/or one or more embodiments of the process flow 1200 described and/or contemplated herein in connection with FIG. 12.

As a specific example, in accordance with an embodiment of the present invention, the VPP apparatus 1330 is configured to: (a) receive a virtual decorative layer (e.g., from the library of virtual decorative layers 1308A), as represented by block 210 in FIG. 2; (b) receive first and second virtual engraving layers (e.g., from the library of virtual engraving layers 1308C), as represented by blocks 220 and 230; (c) create a virtual press plate based at least partially on the first and second virtual engraving layers, as represented by block 240; and (d) create a virtual pressed decorative layer by virtually pressing the virtual press plate to the virtual decorative layer, as represented by block 250. In accordance with some embodiments, the user interface apparatus 1320, the VPP apparatus 1330, and/or the user interface 1340 are each configured to send and/or receive one or more instructions to and/or from each other, such that an instruction sent, for example, from the VPP apparatus 1330 to the user interface apparatus 1340 (and/or vice versa) can trigger the user interface apparatus 1340 (and/or vice versa) to perform one or more portions of any one or more of the embodiments described and/or contemplated herein.

FIGS. 14A and 14B illustrate an embodiment wherein the user interface apparatus 1340 is a mobile computing device 1400 such as a tablet computer. As described above, the mobile computing device 1400 includes a communication interface 1322, a processor 1324, a memory 1326 having an interface application 1327 stored therein, and a user interface 1329. In some embodiments of the mobile computing device 1400, the user interface 1329 includes a touchscreen display 1410 for receiving user input. Of course, a touchscreen is an electronic visual display that can detect the presence and location of a touch within the display area. The term generally refers to touching the display of the device with a finger or hand. Touchscreens can also sense other passive objects, such as a stylus. The touchscreen 1410 enables the user to interact directly with what is displayed, rather than indirectly with a pointer controlled by a mouse or touchpad.

As illustrated, the mobile computing device 1400 may execute the interface application 1327 to be displayed on the touchscreen display 1410. In the illustrated embodiment, the interface application 1327 functions to display a plurality of virtual decorative layers 1420 as well as a plurality of virtual press plates 1430. The virtual decorative layers 1420 and virtual press plates 1430 may be stored in the memory 1326 of the mobile computing device 1400 or may be retrieved from a library 1308 accessible via a network 1310.

With a touchscreen display 1410, the user may utilize a finger (or stylus, etc.) to drag and scroll through the library of virtual decorative layers 1420 and virtual press plates 1430. In the illustrated embodiment, a user may select a decorative layer 1420 and a virtual press plate 1430. The selection may be by any typical means. With a touchscreen display 1410, the user generally selects the virtual decorative layer 1420 and virtual press plate 1430 by touching the desired virtual decorative layer 1420 or virtual press plate 1430 with the user's finger. Once a virtual decorative layer 1420 and a virtual press plate 1430 is selected, the interface application 1327 acts to display a virtual pressed decorative layer 1500 as illustrated in FIG. 15.

While FIGS. 14A and 14B illustrate the virtual decorative layers 1420 and virtual press plates 1430 as an on-screen scrollable list with visual representations of the designs, it should be understood that the interface application 1327 may display the virtual decorative layers 1420 and virtual press plates 1430 as a list organized in any way desired. For example, the list may be ordered by alphabet, types, colors, etc. As an example, a "Ceramic" virtual decorative layer 1420 and corresponding "Ceramic" virtual press plate 1430 is illustrated. Of course, the "Ceramic" virtual decorative layer 1420 and virtual press plate 1430 is merely for illustrative purposes. It will be understood that the list of virtual decorative layers 1420 and virtual press plates 1430 may include any types or designs sorted and titled by any means desired.

Additionally, it will be appreciated that generally, a virtual press plate 1430 is uniquely designed for a particular virtual decorative layer 1420. Thus, typically, the user will wish to select the corresponding virtual press plate 1430 for the desired virtual decorative layer 1420. However, the interface application 1327 of the present invention may allow the user to select any virtual press plate 1430 to be paired with any virtual decorative layer 1420. Indeed, in some embodiments, the virtual decorative layer 1420 may be a solid color or design such that any virtual press plate 1430 may be paired with it in order to view the virtual pressed decorative layer 1500 for comparison.

FIG. 15 illustrates an embodiment of a virtual pressed decorative layer 1500. As illustrated, the "Ceramic" virtual decorative layer 1420 and the "Ceramic" virtual press plate 1430 were selected to construct the virtual pressed decorative layer 1500. Again, the selection of the "Ceramic" layer and press plate for this example embodiment is non-limiting and merely for illustrative purposes. As shown, the interface application 1327 is capable of illustrating the virtual pressed decorative layer 1500 showing a 3-D representation of the virtual pressed decorative layer 1500 on the 2-D display 1410 of the mobile computing device 1400.

Furthermore, as shown in FIG. 15, in one embodiment, after the virtual pressed decorative layer 1500 is produced, the user may opt to "peel" the virtual press plate 1430 from the virtual pressed decorative layer 1500 to illustrate the effects imparted to the virtual decorative layer 1420 when it is virtually pressed to form the virtual pressed decorative layer 1500. The "peeling" may be accomplished by any means. In one embodiment, the display is a touchscreen as described above and the user simply touches an edge of the screen that illustrates the virtual pressed decorative layer 1500 and drags their finger (or stylus, etc.) across the display acting to "peel" the virtual press plate 1430 away from the virtual decorative layer 1420.

Once the user has finished viewing the virtual pressed decorative layer 1500, the user may return to a previous screen (FIGS. 14A and 14B) and select a new virtual decorative layer 1420 and virtual press plate 1430 combination. Returning to the previous screen may, of course, be accomplished by any means including depressing a "Back" or "Return" button. In one embodiment that utilizes the touchscreen technology described above, the user may simply depress any point on the screen and hold for a certain time period (e.g., 2 seconds) and the interface application 1327 may return the user to the selection screen.

Additionally, in some embodiments, after the virtual pressed decorative layer 1500 is displayed, the user may opt to save the electronic representation as an image file or similar. Such ability may be beneficial as it could permit the user to electronically send the image to another, such as a potential customer. Furthermore, the user may opt to print the virtual pressed decorative layer 1500 to an external printer. The printer may be a typical printer or, in some embodiments, the printer is a specialized printer in which the virtual pressed decorative layer 1500 may be printed in 3D such that the user may feel the texture of the printed sample.

In some embodiments, the interface application 1327 may be configured to receive input from the user to illustrate on the display 1410. The input may be a commentary input to be displayed on the display 1410 overlaying the virtual decorative layer(s) 1420, virtual press plate 1430, virtual pressed decorative layer 1500, or any other elements displayed by the interface application 1327. Commentary input may be textual input, drawing input, etc. For example, a user may wish to highlight a certain portion of the displayed element, include notes on the displayed element, etc. The input may be received via the touchscreen by a finger of the user, stylus, etc. It is contemplated that commentary input received from the user and displayed by the interface application 1327 may be saved and stored in the memory of the mobile device 1400 or in external memory in communication with the network 1310.

As discussed above, the interface application 1327 may be in communication with the communication interface 1322 of the user interface apparatus 1322 such as the mobile device 1400. Thus, it is contemplated that the user may send/receive data to/from the user interface apparatus 1322. For example, a laminate manufacturer 1304 may send virtual decorative layer(s) 1420, virtual press plate(s) 1430, virtual pressed decorative layer(s) 1500, etc. to a user customer for review. Conversely, a user may wish to send data such as selected elements or other input received by the interface application 1327 from the user such as commentary input as discussed above. Indeed, in one embodiment, the user may utilize an interactive button displayed by the interface application 1327 that is configured to access the communication interface 1322 and transmit data, such as virtual decorative layer(s) 1420, virtual press plate(s) 1430, virtual pressed decorative layer(s) 1500, etc. with or without commentary input. The data may be transmitted by any means such as via an email application.

Turning now to FIGS. 16 and 17, illustrated are screenshots of an example embodiment of the interface application 1327. FIG. 16 is a screenshot 1600 of an example embodiment of the selection screen discussed above with respect to FIGS. 14A and 14B. FIG. 17 is a screenshot 1700 of an example embodiment of the virtual pressed decorative layer screen discussed above with respect to FIG. 15.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A computer implemented method comprising:
receiving, by a computer processor, a first virtual engraving layer comprising one or more first markings, wherein one or more of the first markings correspond to a first virtual depth level;
receiving, by a computer processor, a second virtual engraving layer comprising one or more second markings, wherein one or more of the second markings correspond to a second virtual depth level, and wherein the second virtual depth level is different than the first virtual depth level;
receiving, by a computer processor, a third virtual engraving layer comprising one or more third markings, wherein one or more of the third markings correspond to a third virtual depth level, and wherein the third virtual depth level is different than the first and second virtual depth levels;
creating, using a computer processor, a virtual press plate based at least partially on the first, second, and third virtual engraving layers, wherein the virtual press plate is an electronic representation of a physical press plate that comprises the one or more first markings, the one or more second markings, and the one or more third markings.

2. A computer implemented method comprising:
receiving, by a computer processor, a first virtual engraving layer comprising one or more first markings, wherein one or more of the first markings correspond to a first virtual depth level;
receiving, by a computer processor, a second virtual engraving layer comprising one or more second markings, wherein one or more of the second markings correspond to a second virtual depth level, and wherein the second virtual depth level is different than the first virtual depth level;
creating, using a computer processor, a virtual press plate based at least partially on the first and second virtual engraving layers, wherein the virtual press plate is an electronic representation of a physical press plate that comprises the one or more first markings and the one or more second markings;
receiving a virtual decorative layer, wherein the virtual decorative layer is an electronic representation of a physical decorative layer; and
creating a virtual pressed decorative layer by virtually pressing, using a processor, the virtual press plate to the virtual decorative layer, wherein the virtual pressed decorative layer is an electronic representation of the physical decorative layer after being pressed by the physical press plate.

3. A computer implemented method comprising:
receiving, by a computer processor, a first virtual engraving layer comprising one or more first markings, wherein one or more of the first markings correspond to a first virtual depth level;
receiving, by a computer processor, a second virtual engraving layer comprising one or more second markings, wherein one or more of the second markings correspond to a second virtual depth level, and wherein the second virtual depth level is different than the first virtual depth level;
creating, using a computer processor, a virtual press plate based at least partially on the first and second virtual engraving layers, wherein the virtual press plate is an electronic representation of a physical press plate that comprises the one or more first markings and the one or more second markings;
presenting a user interface to a user, wherein the user interface comprises a virtual decorative layer, wherein the virtual decorative layer is an electronic representation of a physical decorative layer, and wherein the user interface enables the user to virtually press the virtual press plate to the virtual decorative layer to create a virtual pressed decorative layer, wherein the virtual pressed decorative layer is an electronic representation of the physical decorative layer after being pressed by the physical press plate.

4. A computer implemented method comprising:
receiving, by a computer processor, a first virtual engraving layer comprising one or more first markings, wherein one or more of the first markings correspond to a first virtual depth level;
receiving, by a computer processor, a second virtual engraving layer comprising one or more second markings, wherein one or more of the second markings correspond to a second virtual depth level, and wherein the second virtual depth level is different than the first virtual depth level;
creating, using a computer processor, a virtual press plate based at least partially on the first and second virtual engraving layers, wherein the virtual press plate is an electronic representation of a physical press plate that comprises the one or more first markings and the one or more second markings; and
receiving a virtual decorative layer comprising a decorative design, and
wherein the creating a virtual press plate operation further comprises creating the first virtual engraving layer based at least partially on the decorative design, such that the first markings correspond to a first part of the decorative design.

5. The method of claim 4, wherein the receiving the second virtual engraving layer comprises creating the second virtual engraving layer based at least partially on the decorative design, such that the second markings correspond to a second part of the decorative design, and wherein the second part of the decorative design is different than the first part of the decorative design.

6. The method of claim 4, wherein the creating the first virtual engraving layer comprises using an electronic stylus to draw the first markings on the first virtual engraving layer.

7. An apparatus comprising:
a datastore configured to store a first virtual engraving layer, a second virtual engraving layer, and a virtual decorative layer therein; and
a computing system comprising one or more computer processors and a non-transitory computer readable medium, where the computer readable medium comprises configured computer program instruction code, such that when said instruction code is operated by said one or more computer processors, said one or more computer processors perform the following operations:
create a virtual press plate based at least partially on the first and second virtual engraving layers, wherein the virtual press plate is an electronic representation of a physical press plate that comprises the one or more first markings and one or more second markings having respective different depth levels;
receiving a virtual decorative layer, wherein the virtual decorative layer is an electronic representation of a physical decorative layer; and
creating a virtual pressed decorative layer by virtually pressing, using a processor, the virtual press plate to the virtual decorative layer, wherein the virtual pressed decorative layer is an electronic representation of the physical decorative layer after being pressed by the physical press plate.

8. A computer implemented method comprising:
selecting a virtual decorative layer, wherein the virtual decorative layer is an electronic representation of a physical decorative layer;
selecting a virtual press plate, wherein the virtual press plate is an electronic representation of a physical press plate;
virtually pressing, using a computer processor, the virtual press plate to the virtual decorative layer in order to create a virtual pressed decorative layer, wherein the virtual pressed decorative layer is an electronic representation of the physical decorative layer after being pressed by the physical press plate; and
virtually unpressing, using a computer processor, at least one portion of the virtual pressed decorative layer, such that the virtual pressed decorative layer comprises an unpressed portion and a pressed portion, and such that the unpressed portion may be viewed alongside the pressed portion.

9. The method of claim 8, further comprising:
accessing a website,
wherein the selecting the virtual decorative layer, the selecting the virtual press plate, and the virtually pressing are performed using the website.

10. The method of claim 9, further comprising:
uploading the virtual decorative layer to the website.

11. The method of claim 8,
initiating an application that executes on a mobile communications device,
wherein the selecting the virtual decorative layer, the selecting the virtual press plate, and the virtually pressing are performed using the application.

12. A computer implemented method comprising:
selecting a virtual decorative layer, wherein the virtual decorative layer is an electronic representation of a physical decorative layer;
selecting a virtual press plate, wherein the virtual press plate is an electronic representation of a physical press plate;
virtually pressing, using a computer processor, the virtual press plate to the virtual decorative layer in order to create a virtual pressed decorative layer, wherein the virtual pressed decorative layer is an electronic representation of the physical decorative layer after being pressed by the physical press plate; and
virtually peeling, using a computer processor, at least one portion of the virtual decorative layer off and/or away from at least one portion of the virtual press plate, wherein the virtually peeling occurs after the virtual decorative layer has been at least partially placed over the virtual press plate.

13. An apparatus comprising:
a datastore configured to store a first virtual engraving layer, a second virtual engraving layer, and a third virtual engraving layer, wherein each virtual engraving layer comprises one or more markings corresponding to a virtual depth layer, where the virtual depth layer for one or more markings for each engraving layer is different than the virtual depth levels of the other engraving layers; and
a computing system comprising one or more computer processors and a non-transitory computer readable medium, where the computer readable medium comprises configured computer program instruction code, such that when said instruction code is operated by said one or more computer processors, said one or more computer processors perform the following operations:
receiving the first, second and third virtual engraving layers; and
creating a virtual press plate based at least partially on the first, second, and third virtual engraving layers, wherein the virtual press plate is an electronic representation of a physical press plate that comprises the one or more first markings, the one or more second markings, and the one or more third markings.

14. An apparatus comprising:
a datastore storing a first virtual engraving layer comprising one or more first markings, wherein one or more of the first markings correspond to a first virtual depth level and a second virtual engraving layer comprising one or more second markings, wherein one or more of the second markings correspond to a second virtual depth level, and wherein the second virtual depth level is different than the first virtual depth level; and
a computing system comprising one or more computer processors and a non-transitory computer readable medium, where the computer readable medium comprises configured computer program instruction code, such that when said instruction code is operated by said one or more computer processors, said one or more computer processors perform the following operations:
receiving the first and second virtual engraving layers;
creating, using a computer processor, a virtual press plate based at least partially on the first and second virtual engraving layers, wherein the virtual press plate is an electronic representation of a physical press plate that comprises the one or more first markings and the one or more second markings;
receiving a virtual decorative layer comprising a decorative design, and
wherein the creating a virtual press plate operation further comprises creating the first virtual engraving layer based at least partially on the decorative design, such that the first markings correspond to a first part of the decorative design.

* * * * *